(12) United States Patent
Vilagines et al.

(10) Patent No.: US 10,525,415 B2
(45) Date of Patent: Jan. 7, 2020

(54) PROCESSING SYSTEMS FOR PRODUCED WATER AND METHODS FOR RECOVERING ORGANIC COMPOUNDS FROM THE PRODUCED WATER

(71) Applicant: Saudi Arabian Oil Company, Dhahran (SA)

(72) Inventors: Regis Didier Alain Vilagines, Dhahran (SA); Guillaume Robert Jean Francois Raynel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 89 days.

(21) Appl. No.: 15/624,175

(22) Filed: Jun. 15, 2017

(65) Prior Publication Data
US 2018/0361323 A1     Dec. 20, 2018

(51) Int. Cl.
*B01D 65/02*     (2006.01)
*B01D 71/02*     (2006.01)
(Continued)

(52) U.S. Cl.
CPC ............ *B01D 65/02* (2013.01); *B01D 24/12* (2013.01); *B01D 24/46* (2013.01);
(Continued)

(58) Field of Classification Search
None
See application file for complete search history.

(56) References Cited

U.S. PATENT DOCUMENTS 2,175,081 A * 10/1939 Grebe ...................... C09K 8/72
                                                                    507/277
5,006,248 A    4/1991 Anderson et al.
(Continued)

FOREIGN PATENT DOCUMENTS

CA           2826695 A1    2/2010
DE    202009015183 U1 *  1/2010   ........... C11D 3/0042
(Continued)

OTHER PUBLICATIONS

DE 202009015183 Machine Translation—Houben, Georg et al—dated Feb. 11, 2010 (Year: 2010).*
(Continued)

*Primary Examiner* — Bradley R Spies
(74) *Attorney, Agent, or Firm* — Dinsmore & Shohl

(57) ABSTRACT

Systems and methods for processing produced water containing organic compounds include a processing vessel; a filtration layer including a filtration material; and a cleaning system that provides a washing solution to the filtration material during a cleaning cycle. The filtration layer is configured such that at least a portion of produced water that enters the processing vessel during a processing cycle of the processing system passes through the filtration layer before leaving the processing vessel. The filtration material is a metal compound such as a metal hydroxide or a metal oxyhydroxide that is substantially insoluble in aqueous solution. The washing solution includes a reagent capable of reducing the metal compound to a reduced compound soluble in aqueous solution while not decomposing the organic compounds. The organic compounds such as crude oil may be recovered from the filtration layer material after the cleaning cycle, and the filtration layer may be regenerated.

11 Claims, 13 Drawing Sheets

(51) Int. Cl.
  *B01D 67/00* (2006.01)
  *C02F 1/00* (2006.01)
  *C02F 1/44* (2006.01)
  *B01J 20/06* (2006.01)
  *C02F 1/28* (2006.01)
  *C02F 101/32* (2006.01)
  *B01D 65/08* (2006.01)
  *B01D 24/12* (2006.01)
  *B01D 24/46* (2006.01)
  *C02F 103/10* (2006.01)
  *B01D 61/16* (2006.01)

(52) U.S. Cl.
  CPC ......... *B01D 67/0088* (2013.01); *B01D 71/02* (2013.01); *B01J 20/06* (2013.01); *C02F 1/004* (2013.01); *C02F 1/281* (2013.01); *C02F 1/44* (2013.01); *B01D 61/16* (2013.01); *B01D 65/08* (2013.01); *B01D 2201/085* (2013.01); *B01D 2321/162* (2013.01); *C02F 2101/32* (2013.01); *C02F 2103/10* (2013.01); *C02F 2303/16* (2013.01)

(56) References Cited

U.S. PATENT DOCUMENTS

| | | | |
|---|---|---|---|
| 5,209,838 | A | 5/1993 | Sleppy et al. |
| 7,524,422 | B2 | 4/2009 | Sansalone |
| 7,578,939 | B2 | 8/2009 | Masten et al. |
| 7,597,144 | B2 | 10/2009 | Minnich et al. |
| 7,905,283 | B2 | 3/2011 | Minnich et al. |
| 8,664,150 | B2 | 3/2014 | Mann et al. |
| 2006/0032374 | A1 | 2/2006 | Vrana et al. |
| 2011/0076750 | A1* | 3/2011 | Martin ............... B01D 15/00 435/262 |
| 2012/0223017 | A1 | 9/2012 | Park et al. |
| 2012/0261343 | A1 | 10/2012 | Barron et al. |
| 2013/0075333 | A1 | 3/2013 | Pruet et al. |
| 2013/0319926 | A1 | 12/2013 | Sansalone |
| 2013/0334134 | A1 | 12/2013 | Mierzejewski et al. |
| 2013/0341281 | A1 | 12/2013 | Adams |
| 2014/0021139 | A1 | 1/2014 | Choo |
| 2015/0021267 | A1 | 1/2015 | Choo |
| 2016/0297692 | A1* | 10/2016 | Baeuerle ............ B01D 61/16 |

FOREIGN PATENT DOCUMENTS

| | | | |
|---|---|---|---|
| WO | 9700719 | A1 | 1/1997 |
| WO | 2004101142 | A1 | 11/2004 |
| WO | 2006028441 | A1 | 3/2006 |
| WO | 2007032860 | A1 | 3/2007 |
| WO | 2013075018 | A1 | 5/2013 |
| WO | WO-2014076068 | A1 * | 5/2014 ............ B01D 61/16 |

OTHER PUBLICATIONS

International Search Report and Written Opinion pertaining to International PCT Application No. PCT/US2017/049293, filed Aug. 30, 2017, 15 pages.

Ebrahimi et al., "Investigations on the Use of Different Ceramic Membranes for Efficient Oil-Field Produced Water Treatment", Desalination, 2010, 250, 991-996, Elsevier B.V.

Yu et al., "Solubilities of Synthetic Schwetmannite and Ferrihydrite", Geochemical Journal, 2002, 36, 119-132.

Examination Report pertaining to GCC Application No. 2017/34109 filed Oct. 12, 2017, 4 pages.

* cited by examiner

PROCESSING SYSTEMS FOR PRODUCED WATER AND METHODS FOR RECOVERING ORGANIC COMPOUNDS FROM THE PRODUCED WATER

TECHNICAL FIELD

This disclosure generally relates to the treatment of produced water and, more specifically, to systems for processing produced water and to methods for recovering organic compounds from the produced water.

BACKGROUND

Significant quantities of water are produced in the extraction of hydrocarbon energy resources (currently estimated at approximately 14 billion barrels per year (bbl/yr) across the United States [1 bbl=42 gallons]). Produced water includes water that is brought to the surface during oil and gas exploration and production, often having been trapped in underground formations for centuries. Additionally, produced water can be generated from scrubbers in power plants, dewatering and extracting uranium resources, carbon sequestration, and development of unconventional energy sources. Produced water from any application often contains significant amounts of hydrocarbons such as crude oil that may prevent the produced water from being reused in other applications. Thus, there are ongoing needs for apparatus and methods to process large volumes of produced water, particularly to remove the contaminants such as hydrocarbons from the produced water.

Ceramic membranes have limited ability to process waters such as produced water, owing to the high likelihood that the membranes may be subject to total fouling or even mechanical failure when oil and other hydrocarbons, sand, salt and other chemicals are contacted with or passed through the ceramic membranes. Thus, there are ongoing needs for improved ceramic membranes that may be able to continually filter produced water without becoming irreversibly disabled by total fouling.

Fixed bed or fluidized bed filtration may also be used to adsorb organic contaminants from produced water. During such processes, contaminants in the produced water may be trapped in a layer of particles or adsorbed onto the particles. Eventually, the particles need to be cleaned or replaced. Cleaning or replacing the particles involves added costs. Thus, there are ongoing needs for filtration processes that enable particles to be cleaned or recycled in an efficient manner.

Regardless of the filtration process used to process produced water, hydrocarbons such as crude oil that are removed from the produced water typically are discarded as waste materials. These types of waste may have a detrimental environmental impact. Moreover, the hydrocarbons themselves may have true monetary value that is unrealized when the hydrocarbons are simply discarded. Thus, there are ongoing needs for systems that may be capable of minimizing hydrocarbon waste from produced water processing, as well as enabling value to be realized from the hydrocarbons recovered in process conditions compatible with hydrocarbons production and their downstream operations.

SUMMARY

According to some embodiments, a processing system for produced water containing organic compounds includes a processing vessel having a vessel inlet in fluidic communication with a produced water source and a first vessel outlet; a filtration layer in the processing vessel between the vessel inlet and the first vessel outlet, the filtration layer including a filtration material; and a cleaning system that provides a washing solution to the filtration material during a cleaning cycle of the processing system. The filtration layer is configured in the processing vessel such that at least a portion of produced water from the produced water source that enters the processing vessel through the vessel inlet during a processing cycle of the processing system passes through the filtration layer before leaving the processing vessel through the first vessel outlet as filtered produced water. The filtration material is a metal compound that is substantially insoluble in aqueous solution. In particular, the metal compound is chosen from metal hydroxides, metal oxohydroxides, or combinations thereof. Examples of metal hydroxides include, without limitation, iron(III) hydroxide, copper(II) hydroxide, manganese(III) hydroxide, and chromium(III) hydroxide. Examples of metal oxohydroxides include iron (III) oxohydroxide (ferrihydrite), manganese(III) oxohydroxide, and chromium(III) oxohydroxides. The washing solution includes a reducing reagent. The metal compound is reducible by the reducing agent during the cleaning cycle to form a reduced metal compound that is soluble in aqueous solution. In particular, the reducing reagent is a compound having a reducing capability sufficiently great to reduce the metal compound while not decomposing the organic compounds. In some embodiments, the reducing reagent may be chosen from hypophosphorous acid ($H_3PO_2$), phosphorous acid ($H_3PO_3$), oxalic acid, formic acid, aqueous ammonia ($NH_3$), hydroxylamine ($NH_2OH$), hydrogen in basic conditions, metal thiosulfates ($S_2O_3^{2-}$), metal sulfites, hydride sources such as sodium borohydride, aqueous or dissolved sulfur dioxide ($SO_2$), sodium bisulfite, disodium sulfite, sulfurous acid, or any combination of these. In some embodiments, the reducing reagent may be chosen from sulfurous acid, salts of sulfurous acid, or combinations thereof.

According to further embodiments, processing systems for recovering crude oil from produced water may include a processing vessel having a vessel inlet in fluidic communication with a produced water source and a first vessel outlet; a ceramic membrane between the vessel inlet and the first vessel outlet; a coating layer of a metal compound on a coated surface of the ceramic membrane facing the vessel inlet; and a cleaning system that provides a washing solution to the filtration material during a cleaning cycle of the processing system. In such embodiments the metal compound is selected from the group consisting of iron(III) hydroxide, copper(II) hydroxide, manganese(III) hydroxide, chromium(III) hydroxide, iron(III) oxohydroxide (ferrihydrite), manganese(III) oxohydroxide, chromium(III) oxohydroxide, and combinations thereof. The ceramic membrane is configured such that at least a portion of produced water that enters the processing vessel during a processing cycle of the processing system passes through the coating layer before permeating the ceramic membrane and leaving the processing vessel through the first vessel outlet as filtered produced water. The washing solution is an aqueous solution containing a reducing reagent. In some embodiments, the reducing reagent may be chosen from hypophosphorous acid ($H_3PO_2$), phosphorous acid ($H_3PO_3$), oxalic acid, formic acid, aqueous ammonia ($NH_3$), hydroxylamine ($NH_2OH$), hydrogen in basic conditions, metal thiosulfates ($S_2O_3^{2-}$), metal sulfites, hydride sources such as sodium borohydride, aqueous or dissolved sulfur dioxide ($SO_2$), sodium bisulfite, disodium sulfite, sulfurous acid, or any combination of these. In some embodiments, the reducing reagent may be chosen from sulfurous acid, salts of sulfurous acid, or combinations thereof.

According to further embodiments, methods for recovering organic compounds from produced water may include providing produced water to the produced water source of a processing system according to embodiments previously described. A processing cycle is initiated, during which the produced water is passed through the filtration until the organic compounds collect within filtration layer. Then, a cleaning cycle is initiated to provide the washing solution to the filtration material of the filtration layer, whereby the metal compound is reduced to form a reduced metal compound that is soluble in the washing solution. The washing solution is removed from the processing vessel, and the washing solution removed from the processing vessel contains dissolved reduced metal compound and the organic compounds. The organic compounds are separated from the washing solution. In some embodiments, the organic compounds separated from the washing solution are subsequently recovered. The organic compounds recovered in this manner from the produced water may include crude oil.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure and, together with the description, serve to explain the principles and operations of the claimed subject matter.

DETAILED DESCRIPTION

Specific embodiments of the present disclosure will now be described. It should be apparent to the person of ordinary skill in the art that this disclosure may be embodied in forms having only obvious differences from the specific embodiments described. Thus, the disclosure of specific embodiments should not be construed as limiting the full scope of this disclosure. Rather, these embodiments are provided so that this disclosure will be thorough and complete, and will fully convey the scope of the subject matter to those skilled in the art.

Unless otherwise defined, all technical and scientific terms used herein have the same meaning as commonly understood by one of ordinary skill in the art. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Embodiments of this disclosure are broadly directed to systems and methods for processing produced water. As used in this disclosure, "processing" in reference to produced water may include any procedure by which impurities are filtered or removed from the produced water. In some specific embodiments of this disclosure, processing of produced water includes passing the water through a ceramic membrane or through a fixed or fluidized bed of particles. The systems and methods for processing produced water according to embodiments take advantage of a filtration layer or a protective material that includes a metal compound having a water-insoluble oxidation state and a water-soluble oxidation state. Typically the water-soluble oxidation state is a reduced form of the filtration layer material formed by reacting the filtration layer material with a reducing reagent. The two oxidation states of the filtration layer or protective material enable the protective layer to be easily dissolved and reformed, thus facilitating cleaning and efficiency of processing operations. In general the metal compound creates a protective coating that prevents foreign material in the produced water from completely clogging the processing system such as, for example, by irreversibly fouling a ceramic membrane that may be included within the processing system in some embodiments.

As used in this disclosure, the term "produced water" refers to water that has been subjected to a process or procedure that has contaminated the water with organic compounds such as, for example, crude oil. Produced water commonly originates from gas and oil production plants and from water extracted from the ground in anaerobic conditions and contaminated with oil. Produced water may also be contaminated with particulate matter such as sand.

Figure 1:
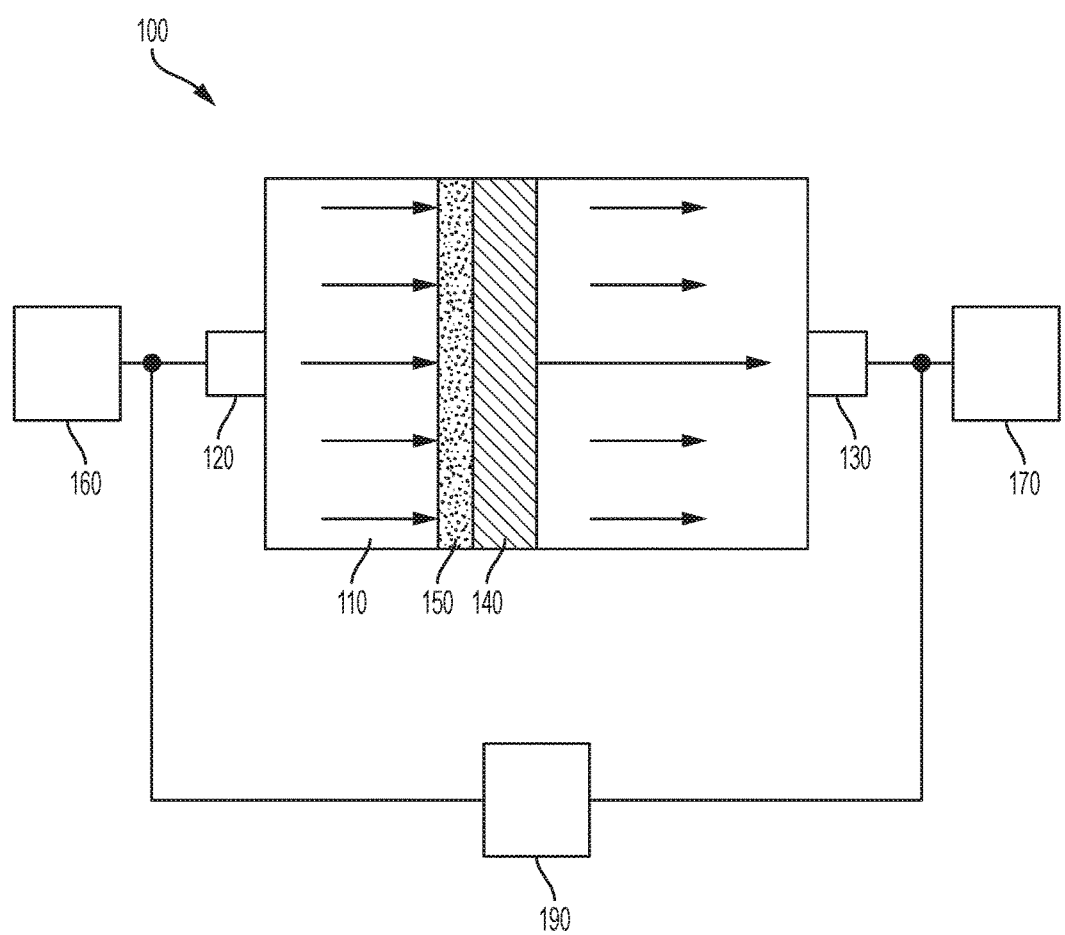
FIG. 1 is a schematic diagram of a processing system for produced water containing organic compounds, according to embodiments.

The schematic of FIG. 1 illustrates conceptually a processing system 100 for produced water that contains organic compounds. Though the embodiments of various processing systems that will be subsequently described may differ with respect to configurations and mechanical features, it should be appreciated that in general each embodiment of processing systems includes components that perform in a manner analogous to that of the processing system 100 of FIG. 1. Thus, it should be understood that, unless stated otherwise, features, components, or materials described as applicable to a processing system 100 are equally applicable to analogous features, components, or materials of implementations of the processing system 100 specifically described in this disclosure, including without limitation a dead-end filtration system 200 (FIG. 4) including a membrane or a particle bed, a parallel cross-flow filtration system 400 (FIG. 7) including a tubular membrane, a parallel upward layout filtration system 800 (FIG. 11) including a particle bed, or a downward layout system 900 (FIG. 12) including a particle bed.

The processing system 100 includes a processing vessel 110 having a vessel inlet 120 in fluidic communication with a produced water source 160 and a first vessel outlet 130 leading to or in fluidic communication with a collection vessel 170. The processing vessel 110 may be any kind of enclosed apparatus or equipment in which water may be processed. The produced water source 160 may be any source of produced water such as, for example, a pipe or hose, a reservoir, a connection to a refinery system out of which produced water emanates, or a connection to a drilling system for a wellbore. The vessel inlet 120 is a fluidic pathway into the processing vessel 110 and may include customary fittings or valves (not shown) to control inflow of produced water from the produced water source 160. Likewise, the first vessel outlet 130 is a fluidic pathway out of the processing vessel 110 and may include customary fittings or valves (not shown) as required by the implementation of the processing system 100.

The processing system 100 further includes a filtration layer 150 in the processing vessel 110 between the vessel inlet 120 and the first vessel outlet 130. The filtration layer 150 includes at least one filtration material. The filtration layer may be supported by, against, or on a porous support 140 that prevents the filtration layer 150 from moving downstream within the processing vessel 110. The filtration layer 150 is configured in the processing vessel 110 such that at least a portion of produced water from the produced water source 160 that enters the processing vessel 110 through the vessel inlet 120 during a processing cycle of the processing system passes through the filtration layer 150 before leaving the processing vessel 110 through the first vessel outlet 130 as filtered produced water. In some embodiments, all of the produced water from the produced water source 160 that enters the processing vessel 110 through the vessel inlet 120 during a processing cycle of the processing system passes through both the filtration layer 150 and the porous support 140 before leaving the processing vessel 110 through the first vessel outlet 130 as filtered produced water. In some embodiments, the portion of produced water from the produced water source 160 that passes through the filtration layer 150 subsequently passes through the porous support 140. In some embodiments to be described in greater detail subsequently, the processing vessel 110 includes a second vessel outlet (not shown in FIG. 1), through which any portion of produced water that does not exit the processing vessel 110 through the first vessel outlet 130 as filtered produced water exits the processing vessel 110 as an unfiltered retentate stream.

In some embodiments, the porous support 140 may be a ceramic membrane. In such embodiments, to be described subsequently in detail, the filtration layer 150 may include a coating of filtration material on a face of the ceramic membrane. In other embodiments, the porous support 140 may be a mesh, a sieve, or a screen, for example. In such embodiments, to be described subsequently in detail, the filtration layer 150 may include a particle bed of particles of the filtration material. Regardless of the type of porous support 140 in the processing system 100, the filtration layer 150 provides the filtration material that is selected to avoid clogging or fouling of the processing system 100.

The filtration material of the filtration layer 150 is a metal compound that is substantially insoluble in aqueous solution. The metal compound is substantially insoluble or completely insoluble in the produced water being processed by the processing system 100. Thereby, the filtration layer 150 may remain intact during the processing cycles of the processing system 100. The metal compound may be a transition metal compound in which the metal atom of the metal compound has at least two possible oxidation states and in the metal compound the metal atom is in the greater of the two possible oxidation states, such that the metal compound may be reduced by reaction with a reducing reagent to a reduced metal compounds in which the metal atom is in the lesser of the two possible oxidation states. For example, an iron(III) metal compound that is insoluble in aqueous solution at a given pH such as, for example, at a pH greater than 2.8, may be reduced to an iron(II) reduced metal compounds that is soluble in aqueous solution.

Suitable filtration materials in this regard include, without limitation, metal hydroxides, metal oxohydroxides, and combinations of metal hydroxides and metal oxohydroxides. Examples of metal hydroxides include, without limitation, iron(III) hydroxide, copper(II) hydroxide, manganese(III) hydroxide, chromium(III) hydroxide, and combinations thereof. Examples of metal oxohydroxides include, without limitation, iron(III) oxohydroxide (ferrihydrite), manganese(III) oxohydroxide, chromium(III) oxohydroxide, and combinations thereof. In example embodiments, the metal compound may include iron(III) hydroxide, ferrihydrite, or combinations thereof. In some embodiments, the metal compound comprises, consists essentially of, or consists of ferrihydrite.

The metal compound of the filtration layer 150 may be in the form of particles, beads, platelets, or as a coating material on a particle, a bead, or a platelet. Alternatively, the metal compound of the filtration layer may be included in a coating layer on the porous support 140. To form a coating layer on a porous support 140 such as a ceramic membrane, a precursor compound such as a metal nitrate salt may be oxidized in air or an oxygen atmosphere under mild heating conditions, such as from 25° C. to 200° C. to form a metal hydroxide or metal oxohydroxide. For example, ferrihydrite may be formed by oxidation in air or oxygen of one or more iron(II) salt such as iron(II) chloride, iron(II) sulfate, iron(II) sulfite, or iron(II) nitrate. As the generally water-soluble iron(II) salts oxidize, they form water-insoluble iron(III) hydroxides or iron(III)oxohydroxides that, in a water solution, are present as a precipitate with particle sizes substantially larger than the pore sizes of the ceramic membrane. An aqueous solution containing the iron(III) hydroxide or iron (III) oxohydroxide precipitate is then poured onto the ceramic membrane, whereby the water of the aqueous solution permeates through the pores of the ceramic membrane and a coating layer of the iron(III) hydroxide or iron(III) oxohydroxides remains on the face of the ceramic membrane onto which the aqueous solution was poured. The ceramic membrane may then be subjected to a heating or drying step to fix the particles onto the face of the ceramic membrane.

The processing system 100 further includes a cleaning system 190 that provides a washing solution to the filtration material of the filtration layer 150 during a cleaning cycle of the processing system 100. The washing solution includes a reducing reagent. The reducing reagent is chosen such that the metal compound is reducible by the reducing agent during the cleaning cycle to form a reduced metal compound that is soluble in aqueous solution. The washing solution provided to the filtration layer 150 during the cleaning cycle may be an aqueous solution of the reducing reagent in a concentration sufficient to reduce the filtration material, specifically the metal compound, in an industrially practical amount of time.

In some embodiments a reducing agent is chosen that has a reducing capacity sufficiently great to reduce the metal compound while also sufficiently limited so as to avoid decomposing or otherwise inactivating the organic compounds present in the produced water. For example, the organic compounds may include crude oil or other hydrocarbons that are sought to be recovered or valorized. Thus, in some embodiments the reducing agent is chosen such that it is capable of reducing the metal compound of the filtration layer 150 while not decomposing or otherwise harming the potential value of the crude oil or other hydrocarbons.

With regard to ability to reduce the metal compound, electrochemical potentials of the metal ion of the metal compound and of components of the reducing agent may be considered. Suitable reducing reagents for metal compounds may include, without limitation, hypophosphorous acid ($H_3PO_2$) or salts thereof, phosphorous acid ($H_3PO_3$) or salts thereof, oxalic acid or salts thereof, formic acid or salts thereof, aqueous ammonia ($NH_3$), ammonium salts, hydroxylamine ($NH_2OH$), hydrogen in basic conditions, metal thiosulfates ($S_2O_3^{2-}$), metal sulfites or alkali metal sulfites, hydride sources such as sodium borohydride, aqueous or dissolved sulfur dioxide ($SO_2$), sodium bisulfite, disodium sulfite, sulfurous acid or salts thereof, or any combination of these. In some embodiments, the reducing reagent may be chosen from aqueous sulfur dioxide, sulfurous acid, salts of sulfurous acid, or combinations thereof.

In example embodiments, the metal compound may be an iron(III) compound such as iron(III) hydroxide, ferrihydrite, or a combination thereof, and the reducing reagent may be sulfurous acid or salts of sulfurous acid such as alkali metal sulfites, sodium bisulfite, or disodium sulfite. When the metal compound is water-insoluble iron(III) oxohydroxide (ferrihydrite) and the reducing reagent is sulfurous acid, for example, the reduced metal compound may be a water soluble iron(II) compound such as iron(II) hydrogen sulfate, also known as iron(II) bisulfate, for example. The reduced metal compound in some embodiments may be reused as a precursor for reforming the filtration layer 150 on the porous support 140 or ceramic membrane after the cleaning cycle.

According to some embodiments, the processing system 100 may include a ceramic membrane as the porous support 140 between the filtration layer 150 and the first vessel outlet 130. In such embodiments the filtration layer 150 may be or may include a coating layer of the metal compound on a coated surface of the ceramic membrane.

Figure 2A:
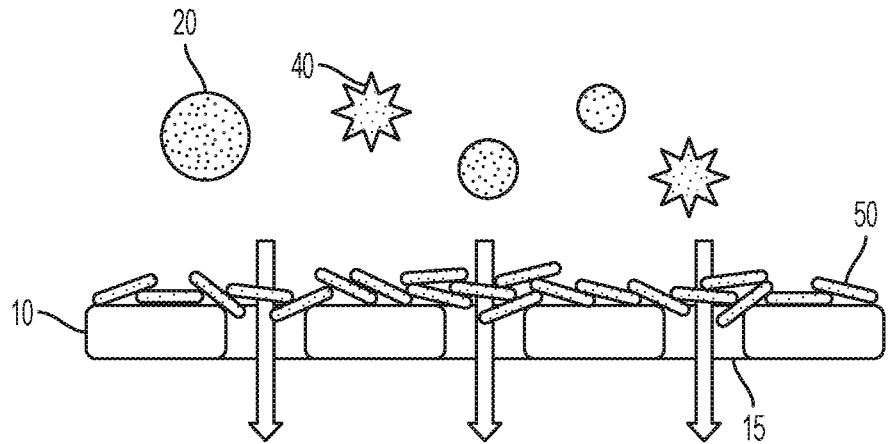
FIG. 2A is a schematic of fluid flow through a ceramic membrane coated with a filtration layer, according to embodiments, at an initial stage of processing.

The function of a ceramic membrane as the porous support 140 for a filtration layer 150 that is a coating of the metal compound is illustrated in FIGS. 2A-2C and FIGS. 3A-3B. Referring to FIG. 2A, a ceramic membrane 10 is coated with a filtration layer 50 such as a water-insoluble layer of iron(III) hydroxide or ferrihydrite, for example. Vertical arrows through pores 15 of the ceramic membrane 10 indicate flow of produced water through the ceramic membrane 10, specifically through the pores 15 of the ceramic membrane. The produced water may contain contaminants such as oil droplets 20 or particulate matter 40.

Figure 2B:
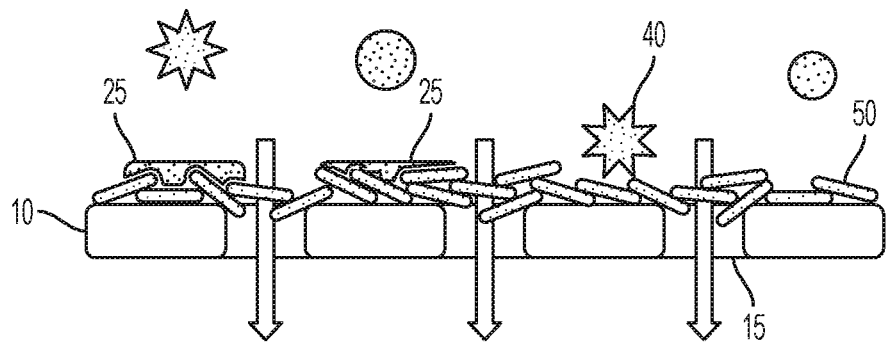
FIG. 2B is a schematic of fluid flow through the ceramic membrane of FIG. 2A, with onset of collection of organic matter from produced water within the protective filtration layer.

Referring to FIG. 2B, as more produced water continues to be processed through the ceramic membrane 10, the oil droplets may form oil deposits 25 on the filtration layer 50 and the particulate matter 40 may also cling to the filtration layer 50. Even so, the filtration layer 50 prevents the oil droplets and the particulate matter from entering the pores 15, where they may stick to walls of the pores 15, potentially clogging them. A proliferation of clogged pores in a ceramic membrane 10 is commonly known as fouling, and if the fouling is extensive it may be irreversible, such that the ceramic membrane 10 cannot be cleaned or reused.

Figure 2C:
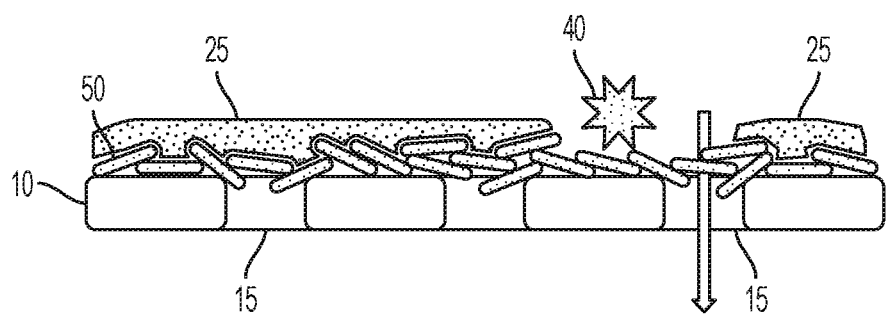
FIG. 2C is a schematic of fluid flow through the ceramic membrane of FIG. 2A after additional processing of produced water compared to the ceramic membrane of FIG. 2B, with significant collection of organic matter from produced water within the protective filtration layer.

Referring to FIG. 2C, at some point during the processing of produced water, the size and extent of the oil deposits 25 and particulate matter 40 on the filtration layer may become so great that little or no additional produced water can traverse through the pores 15. Though for a ceramic membrane lacking a filtration layer of any kind such an extensive fouling may result in the necessary disposal of the ceramic membrane, in the processing systems according to embodiments the filtration layer 50 can be regenerated through a cleaning cycle. The function of the cleaning cycle is illustrated in FIGS. 3A and 3B.

Figure 3A:
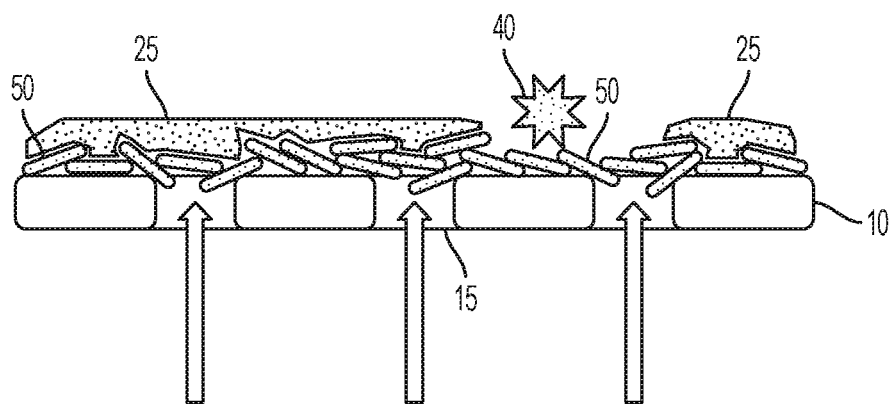
FIG. 3A is a schematic of initiation of a cleaning cycle on the clogged membrane of FIG. 2C.
Figure 3B:
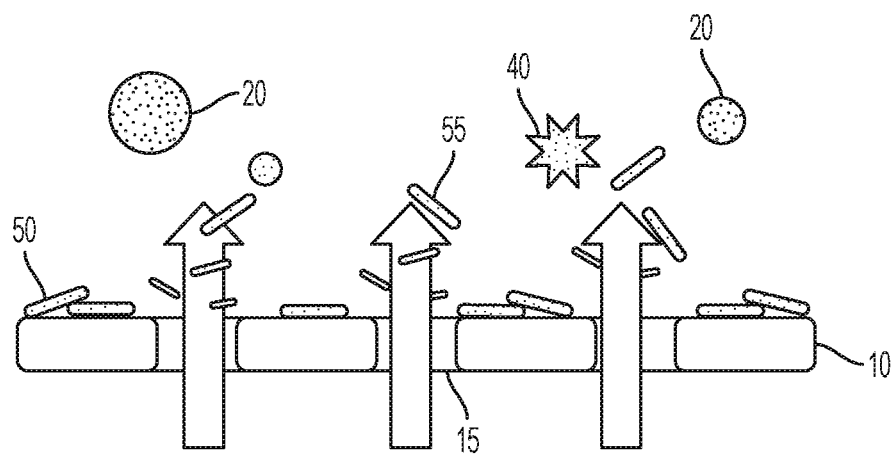
FIG. 3B is a schematic of the disruption and solvation of the filtration layer to unclog the membrane of FIG. 3A during the cleaning cycle, thus regenerating the ceramic membrane for reuse.

The ceramic membrane 10 of FIG. 3A includes the oil deposits 25 and particulate matter on the filtration layer 50, as on the ceramic membrane 10 of FIG. 2C, at the beginning of a cleaning cycle. During the cleaning cycle a cleaning solution containing a reducing reagent, shown in FIG. 3A by upwardly pointing vertical arrows through the pores 15 of the ceramic membrane 10, is backwashed through the ceramic membrane 10. The effect of the backwashing is simulated in FIG. 3B. Namely, as the cleaning solution permeates through the pores 15, the metal compound that forms the filtration layer 50 is reduced to a reduced metal compound that is water soluble. Thus, the cleaning solution effectively dissolves and destroys the filtration layer to dissolving particles 55 that may eventually dissolve completely. The oil that had been deposited on the filtration layer (FIG. 3A) is now present in the cleaning solution as oil droplets 20, along with the particulate matter 40. The cleaning solution holding the solvated reduced metal compound, the oil droplets 20, and the particulate matter may then be phase separated to recover the oil that had been trapped on the filtration layer 50. Once the oil has been recovered, the dissolved metal compound in the aqueous phase of the cleaning solution may be deposited back on the ceramic membrane 10 and subsequently oxidized to reform the filtration layer 50 for further processing cycles.

Figure 4:
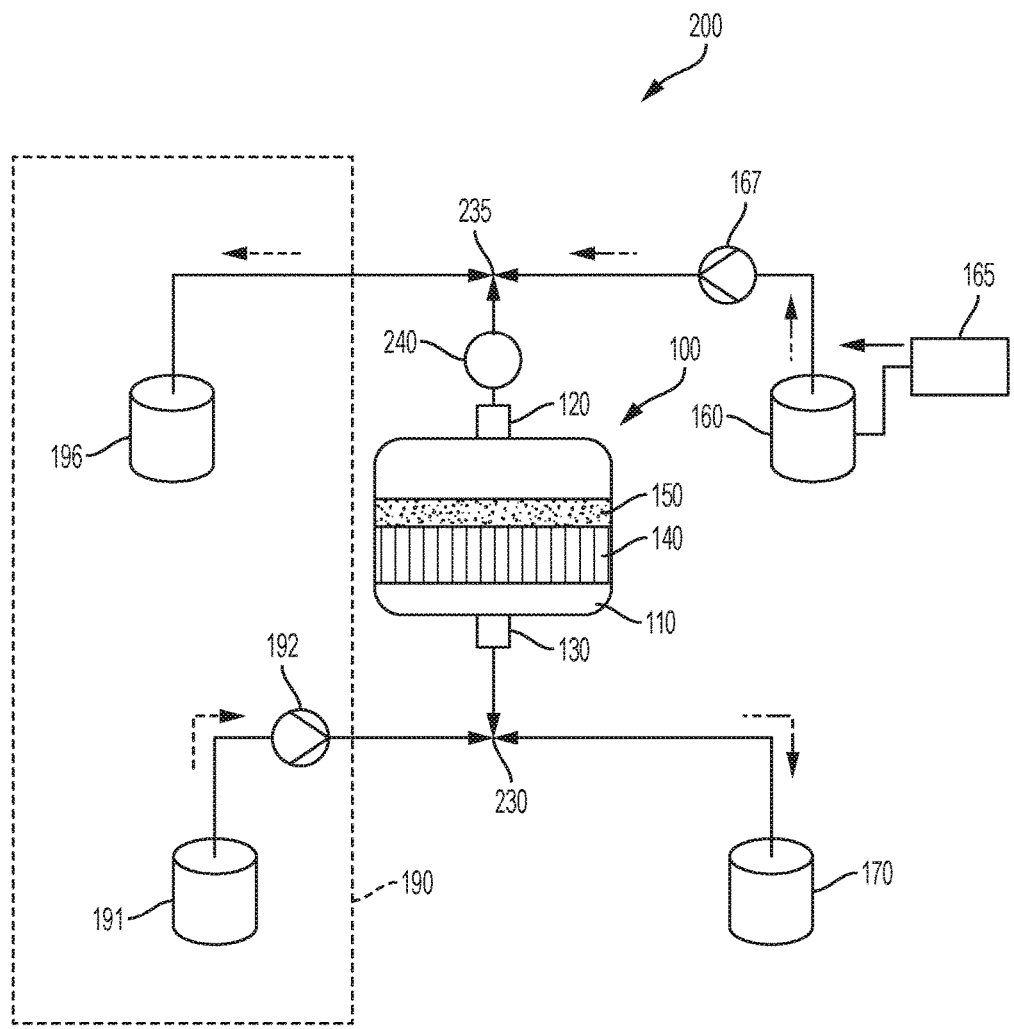
FIG. 4 is a schematic of a dead-end configuration of a processing system for produced water according to embodiments.

Referring to FIG. 4, in one implementation the processing system 100 may be configured as a dead-end filtration system 200. In the dead-end filtration system 200, produced water from the produced water source 160 may be directed to the processing vessel 110 by an inlet pump 167. An inert gas such as nitrogen, for example, which is not reactive toward the organic compounds or crude oil in the produced water, may be added to the produced water at the produced water source 160 to provide an unreactive layer of gas in the filtered produced water collected in a collection vessel 170. The produced water from the inlet pump 167 proceeds through the vessel inlet 120 into the processing vessel 110, where it passes through the filtration layer 150 and the porous support 140 to emerge through the first vessel outlet 130 as filtered produced water. In some embodiments, the porous support 140 of the dead-end filtration system 200 may be a ceramic membrane and the filtration layer 150 may be a coating of metal compound on a face or surface of the ceramic membrane facing the vessel inlet 120. The filtered produced water may be collected at the collection vessel 170.

The dead-end filtration system 200 may further include flow-control apparatus such as three-way valves 230, 235, or a pressure monitor 240. The dead-end filtration system 200 further includes a cleaning system 190. The cleaning system 190 is configured with respect to the three-way valves 230, 235 such that the three-way valves 230, 235 may be actuated to switch the flow of the dead-end filtration system 200 from a processing cycle to a cleaning cycle. In the processing cycle, produced water flows from the produced water source 160 to the collection vessel 170 while the cleaning system 190 is dormant. In the cleaning cycle, washing solution containing the reducing reagent flows from a wash solution vessel 191, with the aid of a wash solution pump 192 into the processing vessel 110 in a backflow direction reversed from the flow direction during the processing cycle. The washing solution is collected at a solution collection vessel, such as a separation vessel 196. At the solution collection vessel or separation vessel 196, the washing solution may contain the reducing reagent, solvated reduced metal compound, and organic compounds such as crude oil. The washing solution may then be phase-separated or further processed to recycle the reducing reagent, the reduced metal compound, or both, and to recover the organic compounds, including any crude oil that may be present.

In embodiments of the processing system 100 (FIG. 1), including the dead-end filtration system 200 (FIG. 4) and other embodiments to be described subsequently, for which the porous support 140 is a ceramic membrane, the ceramic membrane may be any type of ceramic membrane commonly used for filtration of waters or of produced water. Suitable ceramic membranes include, for example, titanium-zirconium oxide membranes, silica membranes, or alumina membranes. The ceramic membrane may be a flat membrane such as a disk, square, or rectangle; an elongated solid membrane having long longitudinal pores or channels, or a tubular membrane.

In some embodiments, the processing system 100 may include a ceramic membrane as the porous support 140 between the filtration layer 150 and the first vessel outlet 130, and the filtration layer 150 is a coating layer of the metal compound on a coated surface of the ceramic membrane. In such embodiments, the metal compound may be chosen from iron(III) hydroxide, copper(II) hydroxide, manganese(III) hydroxide, chromium(III) hydroxide, iron(III) oxohydroxide (ferrihydrite), manganese(III) oxohydroxide, chromium(III) oxohydroxide, and combinations thereof. Further in such embodiments, the washing solution is an aqueous solution of the reducing agent, and the reducing reagent may be selected as previously described, including, for example, sodium bisulfite, disodium sulfite, or sulfurous acid.

In some embodiments for which the processing system 100 includes a ceramic membrane as the porous support 140, produced water from the produced water source 160 that enters the processing vessel 110 through the vessel inlet 120 during a processing cycle of the processing system 100 passes through the filtration layer 150 then passes through the ceramic membrane (the porous support 140) before leaving the processing vessel 110 through the first vessel outlet 130 as filtered produced water.

Figure 5A:
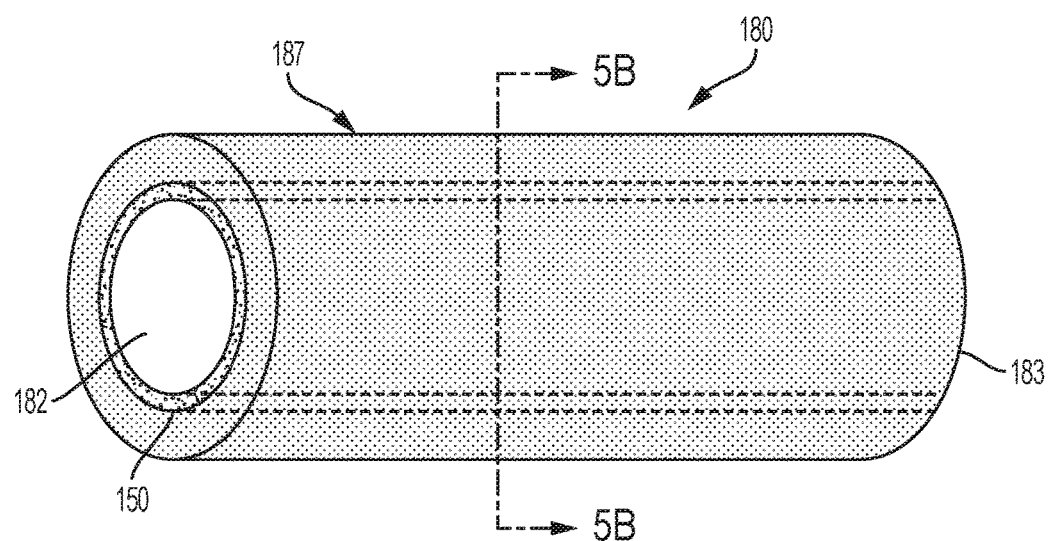
FIG. 5A is a side view of a tubular ceramic membrane internally coated with a filtration layer, according to embodiments.
Figure 5B:
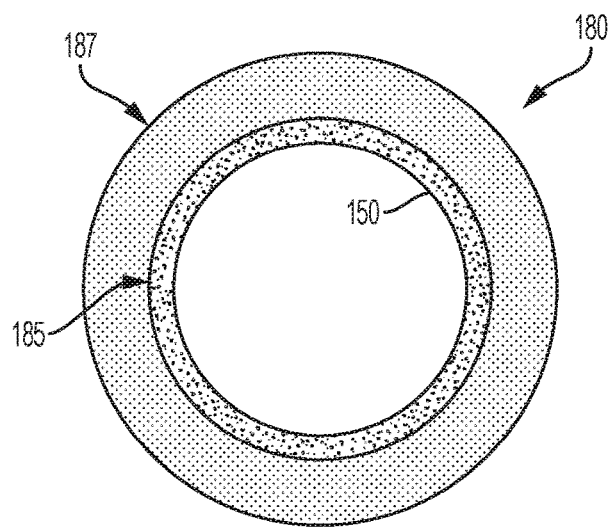
FIG. 5B is a cross-section of the tubular ceramic membrane of FIG. 5A.
Figure 6:
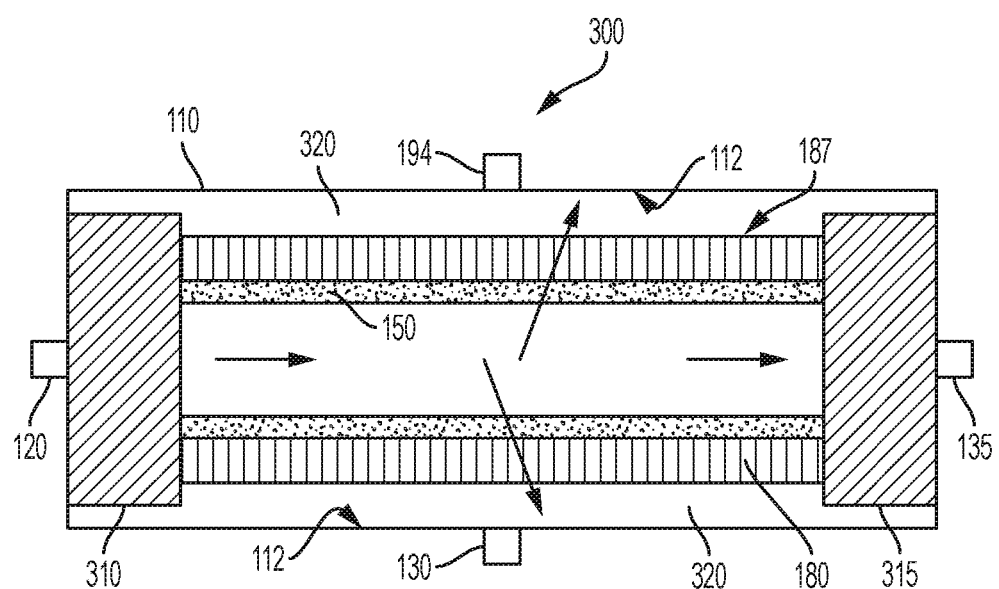
FIG. 6 is a processing vessel of a processing system according to embodiments, including a tubular ceramic membrane for cross-flow processing of produced water.

Referring to FIGS. 5A and 5B, in further embodiments for which the processing system 100 includes a ceramic membrane as the porous support 140, the ceramic membrane may be a tubular membrane 180 having an internal surface 185 and an outer surface 187. The tubular membrane 180 may be a cylindrical membrane with a circular cross section, as in FIGS. 5A and 5B, or may have any geometric cross section, such as an oval, a square, a triangle, or a hexagon, for example. The tubular membrane 180 may itself be the processing vessel 110 (FIG. 1) of a processing system or may be enclosed within the processing vessel 110, for example as part of a tubular membrane vessel 300 (FIG. 6). The tubular membrane has an internal channel longitudinally defined through the tubular membrane 180 from a first end 182 (which may function as the vessel inlet 120) to a second end 183 opposite the first end 182.

The internal surface 185 of the tubular membrane 180 may be coated or covered by a filtration layer 150 of a metal compound, as previously generally described with respect to the processing system 100. The filtration layer 150 may be applied to the internal surface 185 of the tubular membrane 180 using the chemistry described previously for applying the metal compound in combination with known techniques for coating internal surfaces of tubular membranes. When incorporated into a processing system for processing produced water containing organic compounds, the produced water may enter the tubular membrane 180 through the first end 182. A portion of the produced water permeates through the filtration layer and the walls of the tubular membrane 180 to emerge out the outer surface 187 as filtered produced water that may be collected. The remaining produced water that does not permeate the tubular membrane 180 may pass longitudinally through the tubular membrane 180 to the second end 183 as an unfiltered retentate stream.

Referring to FIG. 6, a tubular membrane vessel 300 that may be incorporated into a processing system according to embodiments is shown in cross-section. The tubular membrane vessel 300 includes a tubular membrane 180 coated with a filtration layer 150. The tubular membrane 180 is inserted into an inlet support 310 and an outlet support 315 that provide a seal around the longitudinal ends of the tubular membrane 180. The tubular membrane 180, the inlet support 310, and the outlet support 315 are enclosed within a processing vessel 110. Fluidic connection is established between the tubular membrane 180 and the vessel inlet 120 through the inlet support 310. During a processing cycle, a portion of the produced water that enters the tubular membrane 180 through the vessel inlet 120 permeates through walls of the tubular membrane 180, as illustrated by arrows in FIG. 6, and enter an intermediate space 320 of the processing vessel 110 between the outer surface 187 of the tubular membrane 180 and the inner walls 112 of the processing vessel 110. The permeated produced water, which is filtered produced water, may be removed from the processing vessel 110 through the first vessel outlet 130. The processing vessel 110 of the tubular membrane vessel 300 further includes a second vessel outlet 135, through which a retentate stream of unfiltered produced water exits the processing vessel 110. A fluidic connection is established between the tubular membrane 180 and the second vessel outlet 135 through the outlet support 315. The processing vessel 110 of the tubular membrane vessel 300 further includes a backwash inlet 194, through which washing solution may be added into the tubular membrane vessel 300 during a cleaning cycle.

Thus, referring to FIGS. 1 and 6, the processing system 100 according to embodiments may include a ceramic membrane, particularly a tubular membrane 180, as the porous support 140 and further includes a second vessel outlet 135. In such embodiments, tubular membrane 180 has an outer surface 187 and an internal channel defined within the tubular membrane 180 from a first end 182 (an inlet end, for example) of the tubular membrane 180 to a second end 183 (an outlet end, for example) of the tubular membrane 180. The outer surface 187 of the tubular membrane 180 is in fluidic communication with the first vessel outlet 130. The second end 183 (outlet end) of the tubular membrane 180 is in fluidic communication with the second vessel outlet 135. At least a portion of produced water from the vessel inlet 120 passes through the internal of the tubular membrane 180 to the second vessel outlet 135 as a retentate stream. At least a portion of produced water from the vessel inlet 120 permeates through the tubular membrane 180 to the outer surface 187 of the tubular membrane 180 and emerges from the outer surface 187 as the filtered produced water.

In particular implementations of the processing system 100 (FIG. 1), the processing system 100 may include one tubular membrane vessel 300 or more than one tubular membrane vessel 300. An example of such an implementation includes a parallel cross-flow filtration system 400 of FIG. 7. In the parallel cross-flow filtration system 400, two processing systems are combined, both having analogous components indicated with part references ending in a lower-case letter "a" or a lower-case letter "b." Specifically, the parallel cross-flow filtration system 400 includes two tubular membrane vessels 300a, 300b and is configured in a first state such that a first tubular membrane vessel 300a may be operated in a processing cycle while a second tubular membrane vessel 300b is operated in a cleaning cycle. For the first tubular membrane vessel 300a in the processing cycle, valves 410a, 136a, and 420a are open and valves 193a and 195a to the first cleaning system 190a are closed. For the second tubular membrane vessel 300b in the cleaning cycle, valves 410b, 136b, and 420b are closed and valves 193b and 195b to the second cleaning system 190b are open.

By manipulating the valves 410a, 410b, 136a, 136b, 420a, 420b, 193a, 193b, 195a, 195b, the parallel cross-flow filtration system 400 may be switched to a second state in which, opposite to the functions of the first state, the first tubular membrane vessel 300a is operated in a cleaning cycle while the second tubular membrane vessel 300b is operated in a processing cycle. In particular, the parallel cross-flow filtration system 400 may be switched to the second state by opening the valves 193a, 195a, 410b, 136b, and 420b (shown as closed in FIG. 7) and closing the valves 410a, 136a, 420a, 193b, and 195b (shown as open in FIG. 7). It should be apparent that the parallel cross-flow filtration system 400 in the second state may be reverted to the first state (as in FIG. 7) by again closing the valves 193a, 195a, 410b, 136b, and 420b and opening the valves 410a, 136a, 420a, 193b, and 195b.

Figure 7:
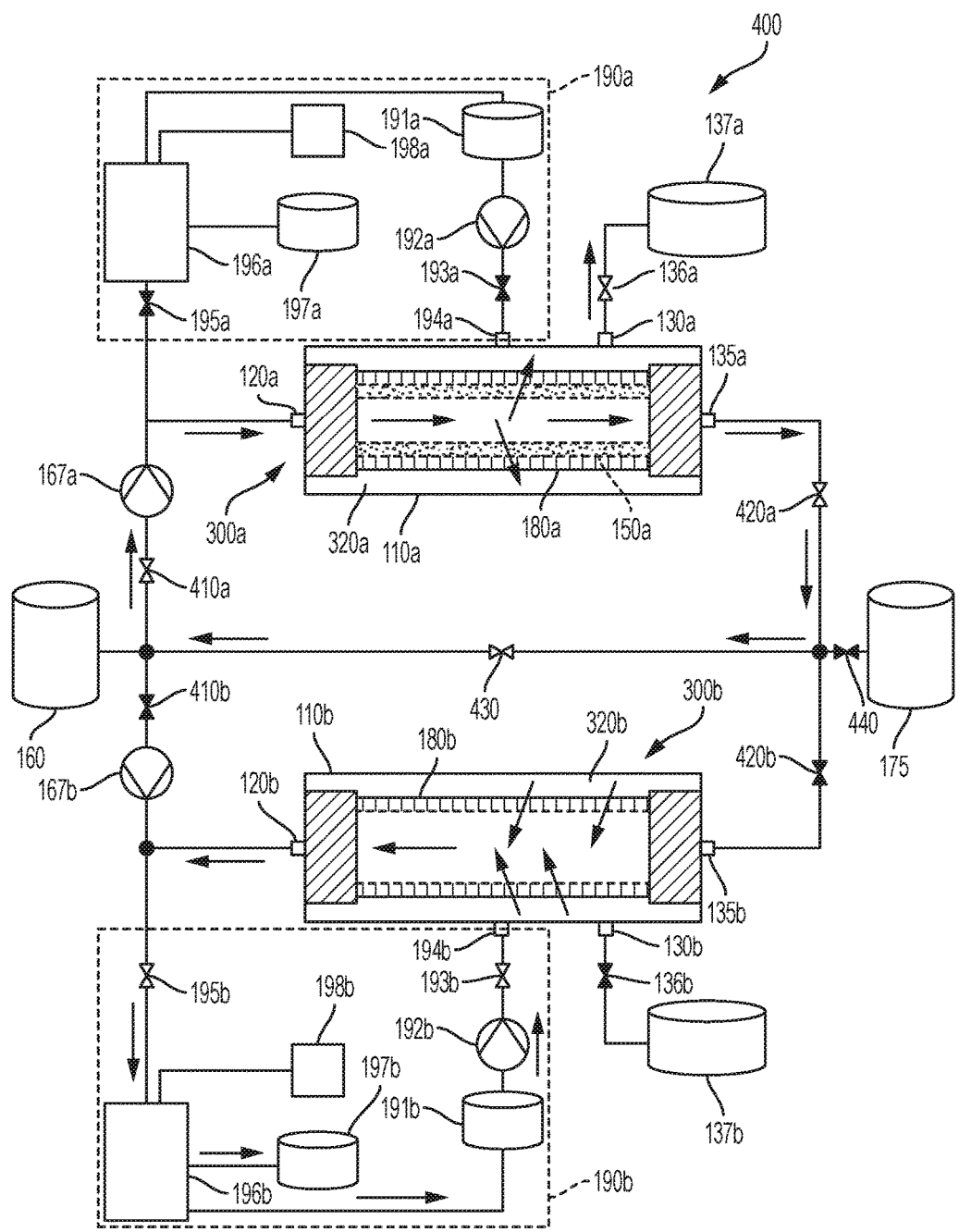
FIG. 7 is a schematic of a processing system for produced water, according to embodiments, including parallel subsystems of tubular ceramic membranes.

With respect to the first tubular membrane vessel 300a in the processing cycle as shown in FIG. 7, produced water from the produced water source 160 is pumped through the inlet pump 167a into the vessel inlet 120a of the processing vessel 110a to enter the internal channel of the tubular membrane 180a. A portion of the produced water permeates through the filtration layer 150a and the tubular membrane 180a into the intermediate space 320a of the processing vessel 110a and exits the processing vessel 110a through the first vessel outlet 130a as filtered produced water. The filtered produced water may then be collected in a permeate collection vessel 137a. The remaining portion of produced water that does not permeate the tubular membrane 180a exits the processing vessel 110a through the second vessel outlet 135a as unfiltered produced water or a retentate stream. When recycle valve 430 is open (as shown), the unfiltered produced water may be fed back through the first tubular membrane vessel 300a for additional filtration and processing. When retentate valve 440 is open (not as shown), the unfiltered produced water or retentate stream may exit the parallel cross-flow filtration system 400 to a retentate collection vessel 175. During the processing cycle involving the first tubular membrane vessel 300a, components of the first cleaning system 190a are isolated and closed off from the system components involved in the processing of the produced water. The isolated components include the wash solution vessel 191a, the wash solution pump 192a, valve 193a, the backwash inlet 194a, valve 195a, the separation vessel 196a, the organic collection vessel 197a, and the separator gas source 198a.

With respect to the second tubular membrane vessel 300b in the cleaning cycle as shown in FIG. 7, washing solution containing a reducing reagent in the wash solution vessel 191b is transported through valve 193b to the backwash inlet 194b by the assistance of wash solution pump 192b. The washing solution enters the intermediate space 320b of the processing vessel 110b and permeates through the outer surface of the tubular membrane 180b into the internal channel of the tubular membrane 180b. On reaching the internal channel of the tubular membrane 180b, the washing solution reduces the metal compound of the filtration layer (intentionally missing from FIG. 7), dissolves the filtration layer and carries the dissolved reduced metal compound and any organic compounds such as crude oil that had attached to the filtration layer during a previous processing cycle, necessitating the cleaning cycle. The washing solution and its solvated and unsolvated components flow out the processing vessel 110b through the vessel inlet 120b and back to the cleaning system 190b through valve 195b.

The washing solution proceeds to a separation vessel 196b. In the separation vessel 196b, the washing solution may be phase-separated, for example, into an aqueous phase and an organic phase that floats on the aqueous phase. A blanket of an inert gas such as nitrogen, for example, may be injected into the separation vessel 196b from a separator gas source 198b to protect the organic compounds in the organic phase from decomposition or reaction within the separation vessel 196b. The organic phase may contain the organic compounds originally present in the produced water emanating from the produced water source 160 such as crude oil, for example. The organic compounds may be extracted from the separation vessel 196b into an organic recovery vessel 197b for further use, purification, or valorization. The aqueous phase may contain solvated reduced metal compound and unreacted reducing reagent. Once the organic phase is extracted from the separation vessel 196b, the aqueous phase may be further processed to recover the reduced metal compound for subsequent reoxidation and application to a fresh tubular membrane as a filtration layer. Alternatively, or after any desired recovery the aqueous phase may be recycled back to the wash solution vessel 191b. If the concentration of reducing reagent in the recycled aqueous phase is too low to enable the washing solution to continue dissolving a filtration layer on the tubular membrane 180b, additional reducing reagent may be added to the washing solution at the wash solution vessel 191b. During the cleaning cycle involving the second tubular membrane vessel 300b, components including the first vessel outlet 130b, valve 136b, valve 410b, valve 420b, inlet pump 167b, the permeate collection vessel 137b, and the second vessel outlet 135b are isolated and closed off from the system components involved in the cleaning cycle.

Referring to FIGS. 4 and 7, in illustrative embodiments of processing systems generally, a processing system for recovering crude oil from produced water may include a processing vessel 110a, 300a having a vessel inlet 120a in fluidic communication with a produced water source 160 and a first vessel outlet 130a. The processing system may include a flat ceramic membrane or a tubular membrane 180a between the vessel inlet 120a and the first vessel outlet 130a. The processing system may include a coating layer (such as a filtration layer 150) of a metal compound on a coated surface 185 (for example, FIG. 5B) of the ceramic membrane facing the vessel inlet 120a. The processing system may include a cleaning system 190a that provides a washing solution to the filtration material during a cleaning cycle of the processing system. In such embodiments, the metal compound may include iron(III) hydroxide, copper(II) hydroxide, manganese(III) hydroxide, chromium(III) hydroxide, iron(III) oxohydroxide (ferrihydrite), manganese(III) oxohydroxide, chromium(III) oxohydroxide, or combinations thereof. Further in such embodiments, the ceramic membrane may be configured such that at least a portion of produced water that enters the processing vessel 110a during a processing cycle of the processing system passes through the coating layer before permeating the ceramic membrane and leaving the processing vessel 110a through the first vessel outlet 130a as filtered produced water. Further in such embodiments, the washing solution may be an aqueous solution containing a reducing reagent chosen from sulfurous acid, salts of sulfurous acid, or combination thereof. In alternate embodiments, the metal compound may be chosen from iron(III) hydroxide, ferrihydrite, and combinations thereof. In other alternate embodiments, the metal compound may include, consist essentially of, or consist of ferrihydrite.

Implementations of the processing system 100 of FIG. 1 have been described previously, for which the porous support 140 includes a ceramic membrane and the filtration layer 150 is a coating of metal compound on the ceramic membrane. Further implementations of the processing system 100, which now will be described with reference to FIGS. 8-12, include embodiments in which the filtration layer 150 is a particle bed 155 of particles of the metal compound and the porous support 140 is a screen 157 or mesh that prevents the particle bed from moving out of the processing vessel 110, such as by holding the particle bed in place by gravity.

Figure 8:
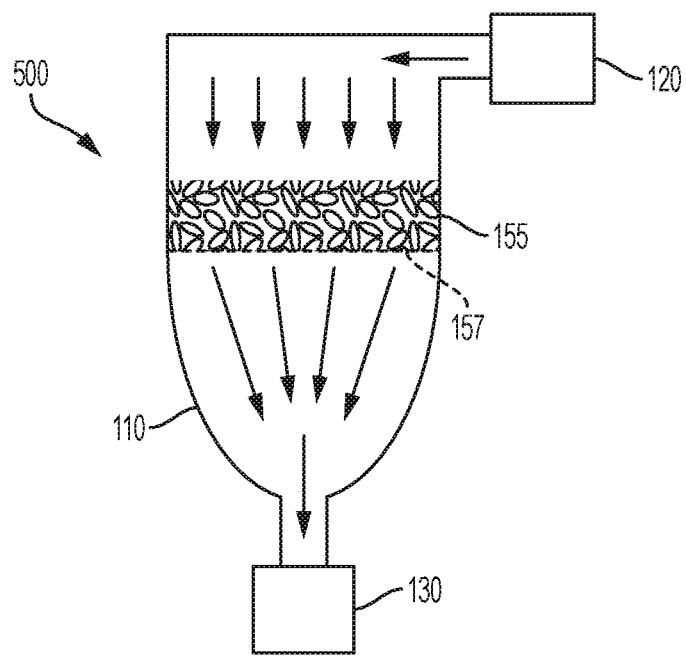
FIG. 8 is a processing vessel of a processing system according to embodiments, including a fixed or fluidized bed of particles of filtration material and configured in a downward flow layout.

Referring to FIG. 8, in some embodiments, the processing system 100 may include a processing vessel 110 configured as a downward layout vessel 500. In a downward layout vessel 500, the processing vessel 110 is configured vertically such that the vessel inlet 120 is above the first vessel outlet 130. The filtration layer of the downward layout vessel 500 includes a particle bed 155 of particles of the metal compound. The particle bed 155 is supported by a porous support such as a screen 157 or other suitable mesh having pores or a mesh size substantially smaller than the size of the particles of metal compound in the particle bed 155. The porous support or screen 157 is placed between the vessel inlet 120 and the first vessel outlet 130, particularly between the particle bed 155 and the first vessel outlet 130. The screen 157 has a mesh size and configuration that permits flow of produced water from the vessel inlet 120 to the first vessel outlet 130 and blocks downward passage of the particles of the particle bed 155 through the screen 157 toward the first vessel outlet 130.

Figure 9:
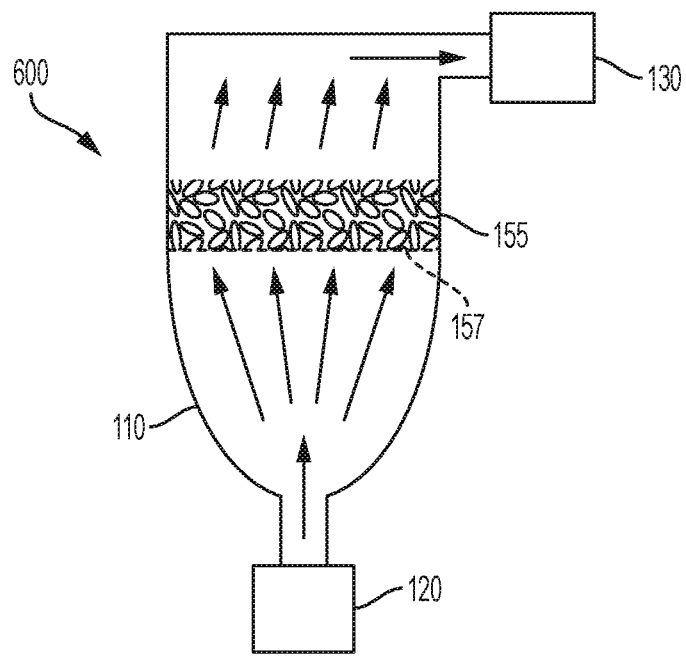
FIG. 9 is a processing vessel of a processing system according to embodiments, including a fixed or fluidized bed of particles of filtration material and configured in an upward flow layout.

Referring to FIG. 9, in some embodiments, the processing system 100 may include a processing vessel 110 configured as an upward layout vessel 600. In an upward layout vessel 600, the processing vessel 110 is configured vertically such that the vessel inlet 120 is below the first vessel outlet 130. As in the downward layout vessel 500 (FIG. 8), the filtration layer of the upward layout vessel 600 includes a particle bed 155 of particles of the metal compound. The particle bed 155 is supported by a porous support such as a screen 157 or other suitable mesh having pores or a mesh size substantially smaller than the size of the particles of metal compound in the particle bed 155. The porous support or screen 157 is placed between the vessel inlet 120 and the first vessel outlet 130, particularly between the particle bed 155 and the vessel inlet 120. The screen 157 has a mesh size and configuration that permits flow of produced water from the vessel inlet 120 to the first vessel outlet 130 and blocks downward passage of the particles of the particle bed 155 through the screen 157 toward the vessel inlet 120.

In embodiments of processing systems configured as either a downward layout vessel 500 (FIG. 8) or an upward layout vessel 600 (FIG. 9), the metal compound may be chosen from metal hydroxides such as iron(III) hydroxide, copper(II) hydroxide, manganese(III) hydroxide, chromium (III) hydroxide, and combinations thereof; or from metal oxohydroxides such as iron(III) oxohydroxide (ferrihydrite), manganese(III) oxohydroxide, chromium(III) oxohydroxide, and combinations thereof; or combinations of metal hydroxides and metal oxohydroxides. For example, the metal compound may be chosen from iron(III) hydroxide, ferrihydrite, and combinations thereof. As an additional example, the metal compound may include, consist essentially of, or consist of ferrihydrite.

Also in embodiments of processing systems configured as either a downward layout vessel 500 (FIG. 8) or an upward layout vessel 600 (FIG. 9), the reducing reagent may be selected from reducing agents previously described including, without limitation, hypophosphorous acid ($H_3PO_2$) or salts thereof, phosphorous acid ($H_3PO_3$) or salts thereof, oxalic acid or salts thereof, formic acid or salts thereof, aqueous ammonia ($NH_3$), hydroxylamine ($NH_2OH$), hydrogen in basic conditions, metal thiosulfates ($S_2O_3^{2-}$), metal sulfites, hydride sources such as sodium borohydride, aqueous or dissolved sulfur dioxide ($SO_2$), sodium bisulfite, disodium sulfite, or sulfurous acid. The washing solution may be an aqueous solution of the reducing agent.

Also in embodiments of processing systems configured as either a downward layout vessel 500 (FIG. 8) or an upward layout vessel 600 (FIG. 9), the particle bed 155 may be configured as a fixed particle bed or as a fluidized particle bed. Generally, fixed particle beds are composed of large particles of the metal compound that remain fixed in place while the produced water flows through the processing vessel 110. The particles of fixed particle beds may have sizes in the range from 0.01 mm to 3.0 mm. This particle size is defined as the square root of the projected area of the particle. In contrast, fluidized particle beds are composed of larger particles than those of the fixed bed. The particles of fluidized particle beds are sufficiently small that they may be swept along with turbulence in the produced water as the produced water flows through the processing vessel 110. The particles of fluidized particle beds are also large enough and heavy enough that they are not swept out of the first vessel outlet 130, particularly in the upward layout vessel 600 in which there may not be a screen between the particle bed 155 and the first vessel outlet 130. The particles of fluidized particle beds may have sizes in the range from 1 mm to 10 mm and an elongation ratio smaller than 3. This particle size is defined as the square root of the projected area of the particle. The elongation ratio is defined as the square root of the ratio of largest projected area to the smallest projected area of the particle.

Figure 10:
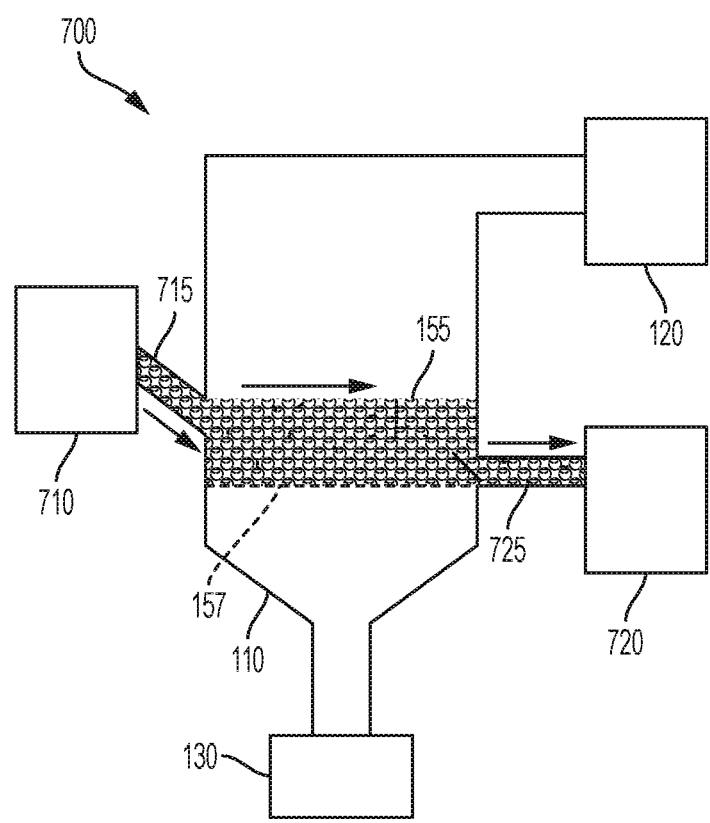
FIG. 10 is a processing vessel of a processing system according to embodiments, including a flowing bed for constant regeneration of filtration material and configured for upward or downward flow layout.

Referring to FIG. 10, in some embodiments of processing systems for produced water than include a particle bed of particles of the metal compound, the processing vessel 110 may be configured as a continuous particle recycling vessel 700. The continuous particle recycling vessel 700 may be operated in a downward layout as shown, with a vessel inlet 120 above the first vessel outlet 130, or in an upward layout analogous to the upward layout vessel 600 (FIG. 9), with a vessel inlet 120 below the first vessel outlet 130. In addition, the continuous particle recycling vessel 700 includes a particle inlet 715 above the screen 157 and a particle outlet 725 also above the screen 157. The particle inlet 715 provides fresh particles of the metal compound to the particle bed 155 from a particle source 710 during the processing cycle.

As the produced water flows through the processing vessel 110 during the processing cycle of the continuous particle recycling vessel 700, spent particles from the particle bed 155 flow toward the particle outlet 725. The spent particles that leave the processing vessel 110 through the particle outlet 725 may flow into a particle recovery vessel 720 that receives the spent particles from the particle outlet 725. In the particle recovery vessel 720 the spent particles may be cleaned or reduced and dissolved with a washing solution that may contain a reducing agent, as previously described. Further, the washing solution used to clean or dissolve the spent particles may be phase-separated into an organic phase and an aqueous phase. Organic compounds such as crude oil, for example, may be extracted and recovered from the organic phase. Washed particles of the metal compound, or solvated reduced metal compound, may be recovered from the aqueous phase and may be regenerated or recycled back to the particle source 710 for reintroduction into the processing vessel 110 of the continuous particle recycling vessel 700.

Figure 11:
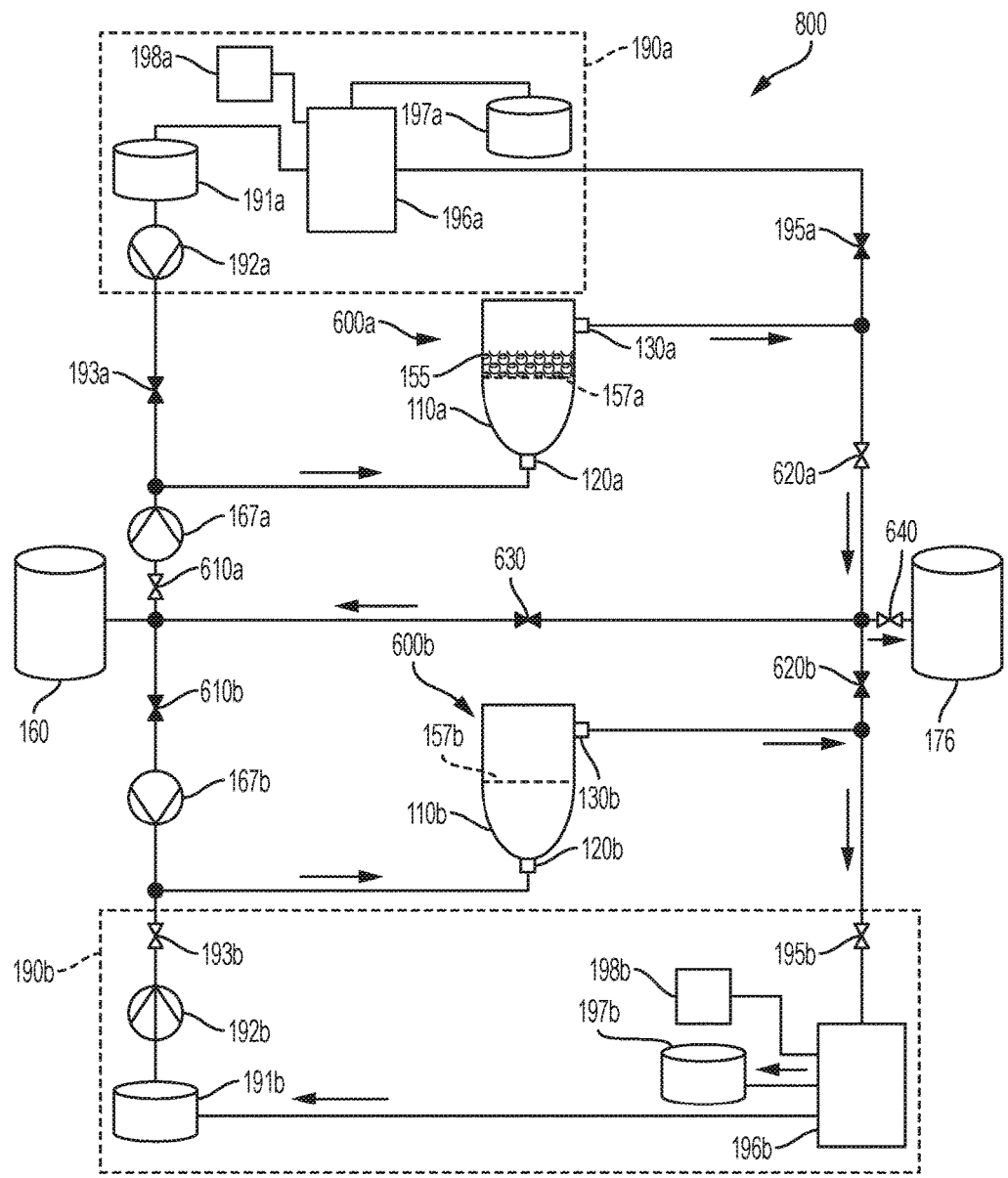
FIG. 11 is a schematic of a processing system for produced water, according to embodiments, including parallel subsystems of processing vessels of FIG. 9 configured in upward flow layouts.
Figure 12:
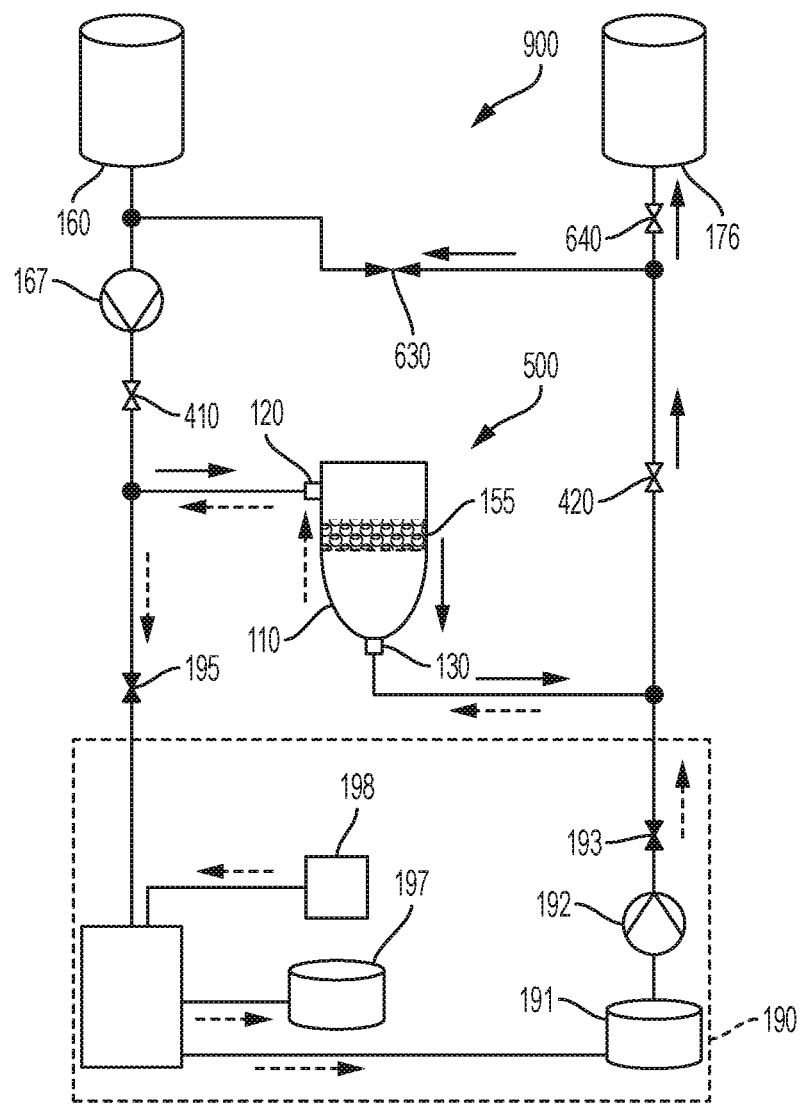
FIG. 12 a schematic of a processing system for produced water, according to embodiments, including a processing vessel of FIG. 10 configured in a downward flow layout.

Specific implementations of processing systems for produced water that include one or more particle beds of the metal compound include the parallel upward layout system 800 of FIG. 11 and the downward layout system 900 of FIG. 12.

Referring to FIG. 11, the parallel upward layout system 800, two processing systems are combined, both having analogous components indicated with part references ending in a lower-case letter "a" or a lower-case letter "b." Specifically, the parallel upward layout system 800 includes two upward layout vessels 600a, 600b and is configured in a first state such that a first upward layout vessel 600a may be operated in a processing cycle while a second upward layout vessel 600b is operated in a cleaning cycle. For the first upward layout vessel 600a in the processing cycle, valves 610a, and 620a are open and valves 193a and 195a to the first cleaning system 190a are closed. For the second upward layout vessel 600b in the cleaning cycle, valves 610b and 620b are closed and valves 193b and 195b to the second cleaning system 190b are open.

By manipulating the valves 610a, 610b, 620a, 620b, 193a, 193b, 195a, 195b, the parallel upward layout system 800 may be switched to a second state in which, opposite to the functions of the first state, the first upward layout vessel 600a is operated in a cleaning cycle while the second upward layout vessel 600b is operated in a processing cycle. In particular, the parallel upward layout system 800 may be switched to the second state by opening the valves 193a, 195a, 610b, and 620b (shown as closed in FIG. 11) and closing the valves 193b, 195b, 610a, and 620a (shown as open in FIG. 11). It should be apparent that the parallel upward layout system 800 in the second state may be reverted to the first state (as in FIG. 11) by again closing the valves 193a, 195a, 610b, and 620b and opening the valves 193b, 195b, 610a, and 620a.

With respect to the first upward layout vessel 600a in the processing cycle as shown in FIG. 11, produced water from the produced water source 160 is pumped through the inlet pump 167a into the vessel inlet 120a to enter the processing vessel 110a. The produced water flows upwardly through the screen 157a and the particle bed 155, then exits the processing vessel 110a through the first vessel outlet 130a as filtered produced water. When valve 640 is open (as shown), the filtered produced water may exit the parallel upward layout system 800 to a water collection vessel 176. When recycle valve 630 is open (not as shown), the produced water may be fed back through the first upward layout vessel 600a for additional filtration and processing. During the processing cycle involving the first upward layout vessel 600a, components of the first cleaning system 190a are isolated and closed off from the system components involved in the processing of the produced water. The isolated components include the wash solution vessel 191a, the wash solution pump 192a, valve 193a, valve 195a, the separation vessel 196a, the organic collection vessel 197a, and the separator gas source 198a.

With respect to the second upward layout vessel 600b in the cleaning cycle as shown in FIG. 11, washing solution containing a reducing reagent in the wash solution vessel 191b is transported through valve 193b to the vessel inlet 120b by the assistance of wash solution pump 192b. In contrast to the parallel cross-flow filtration system 400 described with respect to FIG. 7, the washing solution in the parallel upward layout system 800 flows during the cleaning cycle as the produced water flows during the processing cycle, owing to the support of the particle bed 155 by gravity against the screen 157 in the processing vessel 110b of the upward layout vessel 600b. The washing solution enters the processing vessel 110b and rises through the screen 157.

After passing through the screen 157, the washing solution reduces the metal compound of the particle bed that served as the filtration layer (intentionally missing from FIG. 11) during the processing cycle, dissolves the filtration layer and carries the dissolved reduced metal compound and any organic compounds such as crude oil that had attached to the filtration layer during a previous processing cycle, necessitating the cleaning cycle. The washing solution and its solvated and unsolvated components flow out the processing vessel 110b through the first vessel outlet 130b and back to the cleaning system 190b through valve 195b.

The washing solution proceeds to a separation vessel 196b. In the separation vessel 196b, the washing solution may be phase-separated, for example, into an aqueous phase and an organic phase that floats on the aqueous phase. A blanket of an inert gas such as nitrogen, for example, may be injected into the separation vessel 196b from a separator gas source 198b to protect the organic compounds in the organic phase from decomposition or reaction within the separation vessel 196b. The organic phase may contain the organic compounds originally present in the produced water emanating from the produced water source 160 such as crude oil, for example. The organic compounds may be extracted from the separation vessel 196b into an organic recovery vessel 197b for further use, purification, or valorization. The aqueous phase may contain solvated reduced metal compound and unreacted reducing reagent. Once the organic phase is extracted from the separation vessel 196b, the aqueous phase may be further processed to recover the reduced metal compound for subsequent reoxidation and replacement into an upward layout vessel 600b as a filtration layer. Alternatively, or after any desired recovery the aqueous phase may be recycled back to the wash solution vessel 191b. If the concentration of reducing reagent in the recycled aqueous phase is too low to enable the washing solution to continue dissolving a filtration layer such as the particles of the particle bed 155, additional reducing reagent may be added to the washing solution at the wash solution vessel 191b. During the cleaning cycle involving the second upward layout vessel 600b, components including valve 610b, valve 620b, and the inlet pump 167b are isolated and closed off from the system components involved in the cleaning cycle.

Referring to FIG. 12, a downward layout system 900 analogous to the parallel upward layout system 800 of FIG. 11 is depicted, including only one downward layout vessel 500. It should be understood that systems including downward layout vessels may also be configured with multiple downward layout vessels. The downward layout system 900 of FIG. 12 is depicted with valves 410, 420, and 640 an open position and valves 193 and 195 in a closed position, thus being set for a processing cycle. Reversal of valves 410, 420, and 640 to the closed position and valves 193 and 195 to the open position switches the downward layout system 900 of FIG. 12 to a cleaning cycle. It should be readily understood that all components of the downward layout system 900 of FIG. 12 operate in the same manner as their counterparts on either side of the parallel upward layout system 800 of FIG. 11. The primary operational difference of the downward layout system 900 of FIG. 12 compared to the parallel upward layout system 800 of FIG. 11 is that the produced water during the processing cycle of the downward layout system 900 flows from the top of the processing vessel 110 through the vessel inlet 120 to the bottom of the processing vessel 110 through the first vessel outlet 130, whereas the produced water in the parallel upward layout system 800 flows from the bottom of the processing vessels 110a, 110b to the top of the processing vessels 110a, 110b. Thus, in the downward layout system 900, the cleaning solution during the cleaning cycle flows in a direction opposite the flow direction of the produced water during the processing cycle, unlike in the parallel upward layout system 800 in which the cleaning solution during the cleaning cycle flows in the same direction as the produced water flows during the processing cycle.

Various embodiments of processing systems consistent with the general schematic of FIG. 1 have been described, including processing systems having ceramic membranes as a porous support 140 for a coating of metal compound as the filtration layer 150 and processing systems having a screen as a porous support 140 for a particle bed of particles of a metal compound as a filtration layer 150. Embodiments of methods for processing produced water and, particularly, of recovering organic compounds from produced water, will now be described with references to the example systems 100, 200, 400, 800, and 900 of FIGS. 1, 4, 7, 11, and 12, respectively, as previously described.

In some embodiments, methods for recovering organic compounds from produced water may include providing produced water to the produced water source 160 of any processing system previously described according to embodiments in this disclosure. With the produced water provided to the processing system, a processing cycle may be initiated by opening all valves that permit flow of the produced water to the processing vessel 110 while closing off flow of washing solution from the cleaning system 190 of the processing system. The produced water then is passed through the filtration layer 150 during the processing cycle until the organic compounds from the produced water collect within filtration layer 150.

The methods for recovering organic compounds from produced water further include initiating a cleaning cycle of the processing system to provide the washing solution to the filtration material of the filtration layer 150, whereby the metal compound is reduced to form a reduced metal compound that is soluble in the washing solution. Thereupon, the washing solution may be removed from the processing vessel 110. The washing solution removed from the processing vessel may contain dissolved reduced metal compound and the organic compounds to be recovered. The organic compounds may be separated from the washing solution such as in a separator vessel, for example. The separated organic compounds may then optionally be further cleaned or purified before being recovered in a state, whereby the organic compounds may be further used or valorized. In some embodiments of methods for recovering organic compounds from produced water, the organic compounds may include crude oil.

In some embodiments, the methods for recovering organic compounds from produced water may include recovering the reduced metal compound from the washing solution removed from the processing vessel, such as by isolating an aqueous phase from the washing solution in the separator vessel. The methods may further include oxidizing the reduced metal compound recovered from the washing solution to reform the metal compound, then transferring the reformed metal compound to the processing vessel 110 for use either as a coating functioning as a filtration layer 150 on a ceramic membrane that itself functions as a porous support 140, or as particles of the metal compound in a particle bed 155 that functions as a filtration layer 150.

In some embodiments, the methods for recovering organic compounds from produced water may include a processing system that has a ceramic membrane between the filtration layer 150 and the first vessel outlet 130. The filtration layer 150 may include a coating layer of the metal compound on a coated surface of the ceramic membrane. During methods according to such embodiments, the coating layer of the metal compound is dissolved away from the ceramic membrane when the metal compound is reduced during a cleaning cycle.

In some embodiments, the methods for recovering organic compounds from produced water may include coating a surface of a fresh ceramic membrane with the reduced metal compound recovered after a cleaning cycle. The methods may further include oxidizing the reduced metal compound on the fresh ceramic membrane to form a regenerated coating layer of the metal compound on the surface of the fresh ceramic membrane. The fresh ceramic membrane may be inserted back into the processing vessel 110 before or after the reduced metal compound is oxidized.

In some embodiments, the methods for recovering organic compounds from produced water may include a processing system in which the metal compound is chosen from metal hydroxides, metal oxohydroxides, or combinations thereof. In example embodiments, the metal hydroxides may be chosen from iron(III) hydroxide, copper(II) hydroxide, manganese(III) hydroxide, chromium(III) hydroxide, and combinations thereof. In example embodiments, the metal oxohydroxides may be chosen from iron (III) oxohydroxide (ferrihydrite), manganese(III) oxohydroxide, chromium(III) oxohydroxide, and combinations thereof. In further example embodiments, the metal compound may be chosen from iron(III) hydroxide, ferrihydrite, or combinations thereof. In further example embodiments, the metal compound may include, consist essentially of, or consist of ferrihydrite. In example embodiments, the reducing agent of the washing solution may include a chemical compound that reduces the metal compound while not decomposing or reducing the organic compounds in the produced water, particularly any crude oil that may be present in the produced water. In non-limiting, illustrative embodiments, the reducing reagent may include hypophosphorous acid ($H_3PO_2$) or salts thereof, phosphorous acid ($H_3PO_3$) or salts thereof, oxalic acid or salts thereof, formic acid or salts thereof, aqueous ammonia ($NH_3$), hydroxylamine ($NH_2OH$), hydrogen in basic conditions, metal thiosulfates ($S_2O_3^{2-}$), metal sulfites, hydride sources such as sodium borohydride, aqueous or dissolved sulfur dioxide ($SO_2$), sodium bisulfite, disodium sulfite, or sulfurous acid. In some embodiments, the reducing reagent may include aqueous sulfur dioxide, sulfurous acid or salts of sulfurous acid such as, for example, sodium bisulfite, disodium sulfite, or combinations thereof. The washing solution may be an aqueous solution of the reducing agent.

Thus, embodiments of processing systems for produced water, along with embodiments of methods for recovering organic compounds such as crude oil from produced water using the processing systems, have been described. The processing systems according to embodiments of this disclosure, and their associated methods, may provide valuable solutions for problems pertaining to filtration of oilfield produced waters, such as the clogging or fouling of ceramic membranes and the inability to process large volumes of produced waters in particle bed applications. The fouling mitigation solutions afforded by the processing systems according to embodiments may improve the operational efficiencies of ceramic filtration technology and make such technology competitive with other practiced water de-oiling techniques, such as walnut-shell filtering or induced gas flotation. By providing a cost-effective cleaning process for membrane-based and bed-based water treatment processes, the processing systems according to embodiments may be useful for treating large volumes of produced water under anaerobic conditions, such as those that result daily from industrial processes, particularly in the oil and gas industry. Furthermore, the ability to avoid waste products through de-oiling of produced waters and recycling of the washing solutions used to clean filtration layers such as ceramic membranes in the processing systems according to embodiments, adds to the cost benefits and environmental benefits of the methods for recovering organic compounds from produced water described in this disclosure.

EXAMPLES

The embodiments described in this disclosure will be further clarified by the following examples, which should be understood as not limiting to the scope of this disclosure or to the appended claims.

A laboratory-scale dead-end filtration system was configured as depicted in FIG. 4. Samples of produced water containing from 0.5% to 2.0% by volume crude oil was filtered through a ceramic membrane with a protective coating of ferrihydrite and, as a basis for comparison, through an unprotected ceramic membrane in 200-mL increments. After each 200-mL increment, a backwash cycle was performed using a saturated solution of sodium bisulfite. In both instances, the ceramic membrane was a flat zirconium-titanium oxide ceramic disk having a pore size of 140 nm. Specific flux (J) was measured (units $L/(m^2 \cdot h \cdot bar)$) as a function of total volume (mL) of produced water passed through the ceramic membranes. A normalized flux ($J/J_0$) at each specific flux measurement at a given volume of produced water so processed was computed by dividing the specific flux J at the given volume by an initial flux $J_0$ determined at the first flux measurement after the system was started. Thus, the normalized flux values indicate a fraction of the original flux as a function of the volume of produced water processed by the system. The results from these experiments are summarized in FIG. 13.

Figure 13:
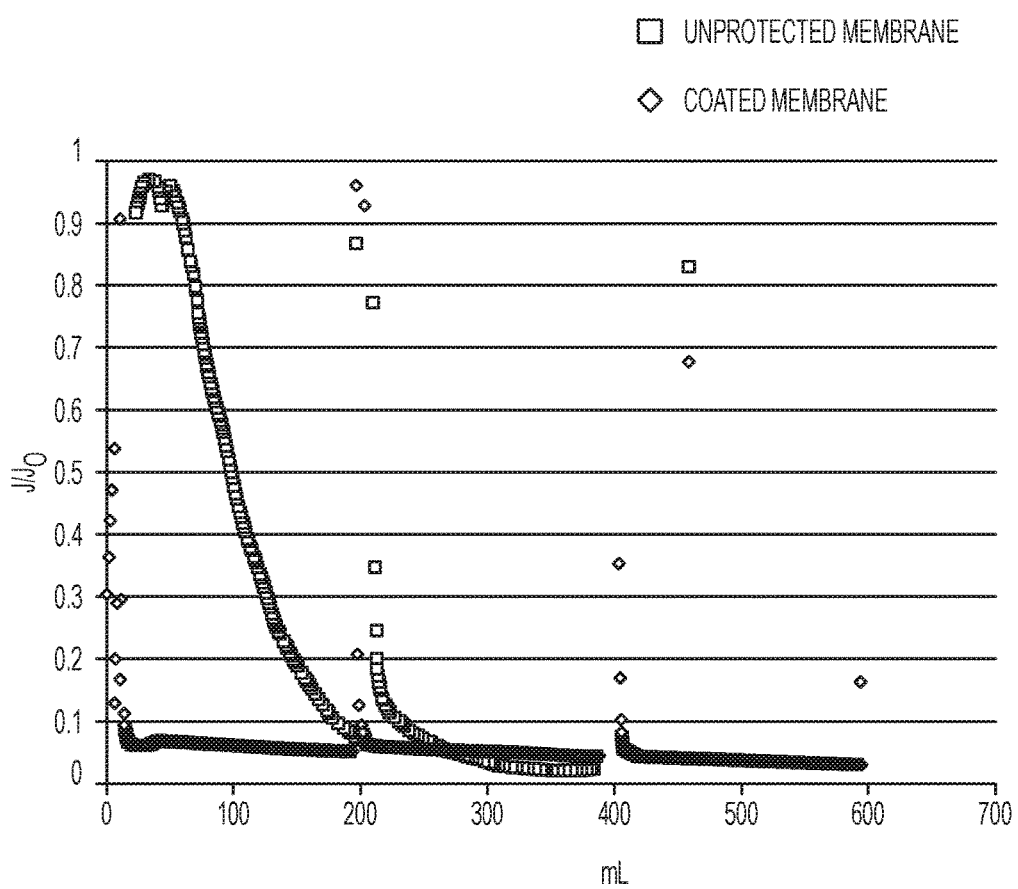
FIG. 13 is a graph comparing normalized flux ($J/J_0$), as a function of volume of produced water processed, for a coated ceramic membrane of a processing system according to embodiments, with that of a prior-art uncoated ceramic membrane.

For the unprotected ceramic membrane, as illustrated in FIG. 13, after about 325 mL of produced water was processed, the normalized flux (MO decreased to approximately 0, which indicated that total fouling had occurred and that the produced water was no longer capable of permeating through the unprotected ceramic membrane. On the other hand, the coated membrane retained the ability after at least two cleaning cycles to maintain a steady normalized flux. No evidence of irreversible total fouling was observed for the coated membrane within the time frame and volume amounts of the experiment, and the normalized flux immediately before each cleaning cycle was consistently about 0.05. This value indicates that immediately before the cleaning cycle, the specific flux of the coated ceramic membrane was approximately 5% of the specific flux of a fresh coated ceramic membrane.

Further experimentation was performed to assess the ability to recover crude oil from produced water filtered through a ferrihydrite-coated ceramic membrane. Three 400-mL samples of produced water, containing 0.5%, 1.0%, and 2.0% by volume crude oil were processed through the dead-end filtration system of FIG. 4 in 200-mL increments between. Cleaning cycles were performed after 200 mL and 400 mL of each sample of produced water had been processed. During the cleaning cycles, a reducing solution of saturated sodium bisulfite was passed through the coated ceramic membrane to detach the crude oil from the surface and to dissolve the ferrihydrite coating. The used reducing solution was collected. The modified membrane was then immersed into the saturated sodium bisulfite solution for approximately one hour. Once the reducing solution dissolved the metal coating, the reducing solution was added to the reducing solution used in the backwash procedure. The reducing solution was transferred to a gravimetric separation tank, where the crude oil was separated from the reducing solution by a centrifuge. The data are summarized in Table 1.

TABLE 1

| Initial oil fraction in 400 mL produced water (% Volume) | Total oil phase volume in filtered sample (mL) | Recovered oil volume in cleaning solution (mL) | Recovery efficiency (% Vol) |
| --- | --- | --- | --- |
| 0.5 | 2 | 1.8 ± 0.1 | 90 ± 5 |
| 1.0 | 4 | 3.5 ± 0.1 | 87.5 ± 2.5 |
| 2.0 | 6 | 5.1 ± 0.1 | 85 ± 1.7 |

A typical industrial facility that processes produced water may operate at a rate of processing from 5,000 barrels of produced water per day (bbl/day) to 40,000 bbl/day, where a barrel is 42 gallons (about 160 liters). Based on the data of Table 1, it is believed that for a typical recoverable crude oil content of from about 0.45 percent by volume to 1.7 percent by volume in the produced water so processed, the processing systems according to embodiments may enable the recovery of from about 20 bbl/day up to at least 680 bbl/day of crude oil having ascertainable value for further uses or refining processes.

In an additional experiment, a cross-flow filtration pilot plant was configured as depicted in FIG. 7, using a 150 kDa titanium-zirconium oxide membrane having a pore size of less than 140 nm, internally coated with ferrihydrite and the same produced water used for the experiment on the dead-end filtration system. The trans membrane pressure was 0.435 bar, and a stable permeate flux was set at of 325 L/(m$^2$·h·bar) at 60° C. The total organic composition (TOC) data on the retentate stream measured at the beginning of the experiment, at 24 hours, and at 96 hours showed that, even after 4 days without a cleaning cycle, only 30% of the crude oil was deposited on the tubular ceramic membrane. Data from this experiment are summarized in Table 2.

TABLE 2

| Parameters | Time (T) = 0 | T = 24 hours | T = 96 hours |
| --- | --- | --- | --- |
| TOC (mg/L) | 61.7 | 53.1 | 45.5 |
| Oil Content (mg/L) | 5.6 | 3.7 | 3.9 |

Figure 14:
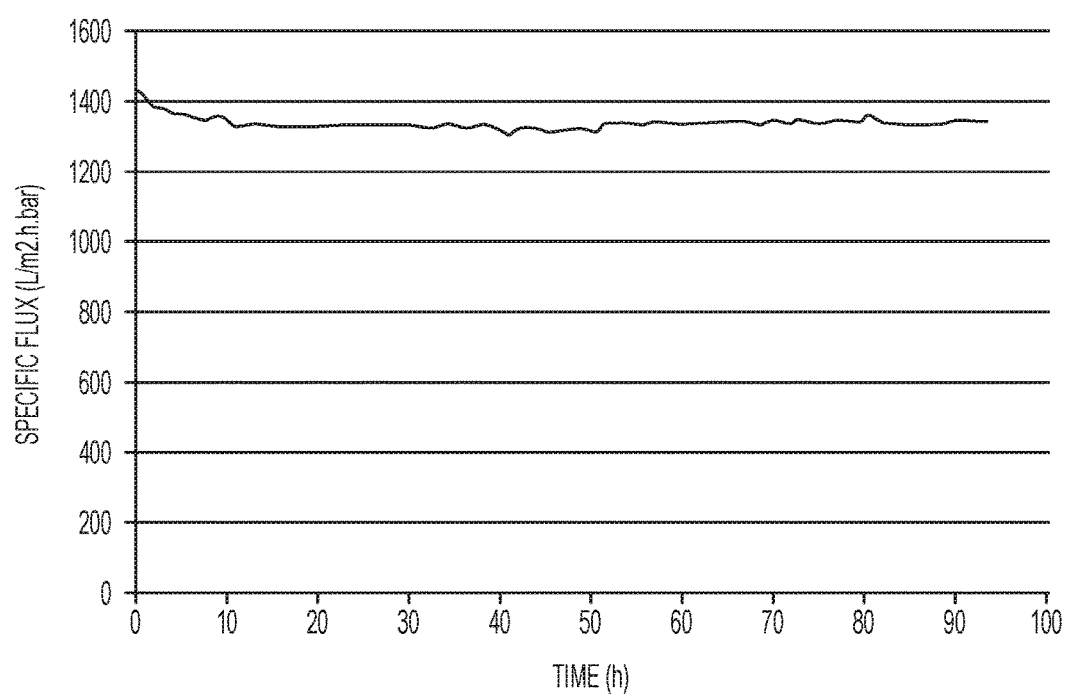
FIG. 14 is a graph of specific flux data as a function of time, collected from a processing system according to embodiments, in which the processing vessel included a tubular ceramic membrane internally coated with a filtration layer configured for cross-flow configuration as in FIG. 6.

Specific flux of the produced water through the tubular membrane was plotted as a function of time, as provided in FIG. 14. Over the course of greater than 90 hours, the specific flux of the system was relatively constant even without a cleaning cycle. The plot of FIG. 14 represents a consistent normalized flux (J/J$_0$) of greater than or equal to 0.92 over the timeframe of the experiment. It is believed that the cross-flow filtration systems may retain a much greater normalized flux because the filtration in a tubular membrane occurs through the walls of the membrane while unfiltered retentate material is still capable of passing through the opposite end of the membrane without needing to permeate the membrane itself.

Unless otherwise indicated, the disclosure of any ranges in the specification and claims are to be understood as including the range itself and also anything subsumed therein, as well as endpoints.

It should be apparent to those skilled in the art that modifications and variations can be made to the embodiments described herein without departing from the spirit and scope of the claimed subject matter. Thus, it is intended that the specification cover the modifications and variations of the various embodiments described herein, provided such modifications and variations come within the scope of the appended claims and their equivalents.

We claim:

1. A method for recovering organic compounds from produced water, the method comprising:
    providing produced water to a produced water source of a processing system comprising:
        a processing vessel having a vessel inlet in fluidic communication with the produced water source and a first vessel outlet;
        a filtration layer in the processing vessel between the vessel inlet and the first vessel outlet, the filtration layer comprising a filtration material; and
        a cleaning system that provides a washing solution to the filtration material during a cleaning cycle of the processing system, wherein:
            the filtration layer is configured in the processing vessel such that at least a portion of produced water from the produced water source that enters the processing vessel through the vessel inlet during a processing cycle of the processing system passes through the filtration layer before leaving the processing vessel through the first vessel outlet as filtered produced water;
            the filtration material is a metal compound that is substantially insoluble in aqueous solution, the metal compound being chosen from metal hydroxides, metal oxyhydrides, or combinations thereof;
            the washing solution comprises a reducing reagent; and
            the metal compound is reducible by the reducing agent during the cleaning cycle to form a reduced metal compound that is soluble in aqueous solution;
    initiating a processing cycle;
    passing the produced water through the filtration layer during the processing cycle until the organic compounds collect within filtration layer;
    initiating a cleaning cycle to provide the washing solution to the filtration material of the filtration layer, whereby the metal compound is reduced to a reduced metal compound that is soluble in the washing solution;
    removing the washing solution from the processing vessel, the washing solution removed from the processing vessel containing dissolved reduced metal compound and the organic compounds;
    separating the organic compounds from the washing solution;
    recovering the reduced metal compound from the washing solution removed from the processing vessel;
    oxidizing the reduced metal compound recovered from the washing solution to reform the metal compound; and
    transferring the reformed metal compound to the processing vessel.

2. The method of claim 1, wherein the organic compounds comprise crude oil.

3. The method of claim 1, wherein:
the processing system further comprises a ceramic membrane between the filtration layer and the first vessel outlet;
the filtration layer comprises a coating layer of the metal compound on a coated surface of the ceramic membrane; and
the coating layer of the metal compound is dissolved away from the ceramic membrane when the metal compound is reduced during the cleaning cycle.

4. The method of claim 3, further comprising:
coating a surface of a fresh ceramic membrane with the reduced metal compound;
oxidizing the reduced metal compound on the fresh ceramic membrane to form a regenerated coating layer of the metal compound on the surface of the fresh ceramic membrane; and
inserting the fresh ceramic membrane into the processing vessel before or after the reduced metal compound is oxidized.

5. The method of claim 1, wherein:
the metal hydroxides are selected from the group consisting of iron(III) hydroxide, copper(II) hydroxide, manganese(III) hydroxide, chromium(III) hydroxide, and combinations thereof; and
the metal oxyhydroxides are selected from the group consisting of iron(III) oxyhydroxide (ferrihydrite), manganese(III) oxyhydroxide, chromium(III) oxyhydroxide, and combinations thereof.

6. The method of claim 1, wherein the reducing reagent is chosen from hypophosphorous acid or salts thereof, phosphorous acid or salts thereof, oxalic acid or salts thereof, formic acid or salts thereof, aqueous ammonia, ammonium salts, hydroxylamine, hydrogen in basic conditions, metal thiosulfates, metal sulfites or alkali metal sulfites, hydrides, sodium borohydride, sodium bisulfite, disodium sulfite, aqueous sulfur dioxide, sulfurous acid or salts thereof, or any combination thereof.

7. The method of claim 1, wherein the metal compound is selected from the group consisting of iron(III) hydroxide, ferrihydrite, and combinations thereof.

8. The method of claim 1, wherein the reducing reagent comprises aqueous sulfur dioxide, sulfurous acid, or a salt of sulfurous acid.

9. The method of claim 1, wherein the metal compound is ferrihydrite.

10. The method of claim 1, wherein the filtration layer comprises a particle bed supported by a screen within the processing vessel inlet and the first vessel outlet, the particle bed comprising particles of the metal compound.

11. A method for recovering organic compounds from produced water, the method comprising:
providing produced water to a produced water source of a processing system comprising:
  a processing vessel having a vessel inlet in fluidic communication with the produced water source and a first vessel outlet;
  a filtration layer in the processing vessel between the vessel inlet and the first vessel outlet, the filtration layer comprising a filtration material;
  a ceramic membrane between the filtration layer and the first vessel outlet; and
  a cleaning system that provides a washing solution to the filtration material during a cleaning cycle of the processing system, wherein:
    the filtration layer is configured in the processing vessel such that at least a portion of produced water from the produced water source that enters the processing vessel through the vessel inlet during a processing cycle of the processing system passes through the filtration layer before leaving the processing vessel through the first vessel outlet as filtered produced water;
    the filtration material is a metal compound that is substantially insoluble in aqueous solution, the metal compound being chosen from metal hydroxides, metal oxyhydroxides, or combinations thereof;
    the filtration layer comprises a coating layer of the metal compound on a coated surface of the ceramic membrane;
    the washing solution comprises a reducing reagent; and
      the metal compound is reducible by the reducing agent during the cleaning cycle to form a reduced metal compound that is soluble in aqueous solution;
initiating a processing cycle;
passing the produced water through the filtration layer during the processing cycle until the organic compounds collect within filtration layer;
initiating a cleaning cycle to provide the washing solution to the filtration material of the filtration layer, whereby the metal compound is reduced to a reduced metal compound that is soluble in the washing solution;
removing the washing solution from the processing vessel, the washing solution removed from the processing vessel containing dissolved reduced metal compound and the organic compounds;
separating the organic compounds from the washing solution;
recovering the reduced metal compound from the washing solution removed from the processing vessel;
oxidizing the reduced metal compound recovered from the washing solution to reform the metal compound; and
transferring the reformed metal compound to the processing vessel.

* * * * *